United States Patent
Liu

(10) Patent No.: US 12,021,402 B2
(45) Date of Patent: Jun. 25, 2024

(54) MULTI-CELL BATTERY CHARGING SYSTEM AND CONTROL METHOD

(71) Applicant: Halo Microelectronics International, Campbell, CA (US)

(72) Inventor: Rui Liu, Fremont, CA (US)

(73) Assignee: Halo Microelectronics International, Campbell, CA (US)

( * ) Notice: Subject to any disclaimer, the term of this patent is extended or adjusted under 35 U.S.C. 154(b) by 490 days.

(21) Appl. No.: 17/402,133

(22) Filed: Aug. 13, 2021

(65) Prior Publication Data

US 2023/0047446 A1 Feb. 16, 2023

(51) Int. Cl.
*H02J 7/00* (2006.01)
*H02J 7/34* (2006.01)
*H02M 1/00* (2006.01)
*H02M 3/07* (2006.01)

(52) U.S. Cl.
CPC .......... *H02J 7/0019* (2013.01); *H02J 7/0016* (2013.01); *H02J 7/007182* (2020.01); *H02J 7/345* (2013.01); *H02M 1/0095* (2021.05); *H02M 3/073* (2013.01); *H02J 2207/20* (2020.01); *H02J 2207/50* (2020.01)

(58) Field of Classification Search
CPC ...................................................... H02J 7/0019
USPC ......................................................... 320/108
See application file for complete search history.

(56) References Cited

U.S. PATENT DOCUMENTS

| | | | |
|---|---|---|---|
| 2009/0251000 A1* | 10/2009 | Su | B60L 58/33 307/9.1 |
| 2019/0047433 A1* | 2/2019 | Rozman | B60W 20/00 |
| 2023/0026736 A1* | 1/2023 | Liu | H02M 1/0095 |

\* cited by examiner

*Primary Examiner* — Yalkew Fantu
(74) *Attorney, Agent, or Firm* — AP3 Law Firm PLLC

(57) ABSTRACT

A method includes turning on a first group of switches of a switched capacitor converter in a battery charging system to establish a first conductive path, and configuring a system voltage at a system bus to charge a first flying capacitor to a predetermined voltage level through the first conductive path, wherein the predetermined voltage level is less than the system voltage, and turning on a second group of switches of the switched capacitor converter in the battery charging system to establish a second conductive path to charge a battery, wherein a sum of a voltage across the first flying capacitor and the system voltage is applied to the battery.

18 Claims, 13 Drawing Sheets

MULTI-CELL BATTERY CHARGING SYSTEM AND CONTROL METHOD

TECHNICAL FIELD

The present invention relates to a battery charging system, and, in particular embodiments, to a multi-cell battery charging system.

BACKGROUND

As technologies further advance, a variety of portable devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the plurality of rechargeable battery cells. The battery charger is controlled to provide voltage (e.g., a constant voltage charging mode) and current (e.g., a constant current charging mode) to the plurality of rechargeable battery cells so as to restore energy to the battery.

As power consumption has become more important, there may be a need for reducing the length of time to charge the battery. Fast charging has emerged as a veritable solution to satisfy the ever-changing demand from consumers. In a fast charging system, a switched capacitor converter is employed to deliver high current to the battery while keeping the input current (e.g., USB cable current) low. The switched capacitor converter has various advantages such as monolithic integration of the converter without external inductors, high power conversion efficiency and the like. The switched capacitor converter is capable of achieving a safe and quick charging of large-capacity batteries.

Modern smartphones often require large capacity batteries to achieve the desired operation time between battery charges. Recent developments in battery fast charging technologies have encountered challenges to reduce the excessive power dissipation resulting from the large input current when directly charging a single cell battery. The large input current also requires customized USB connectors, thereby adding additional system costs. A dual-cell battery includes two battery cells connected in series. The dual-cell battery helps to resolve the large input current issue due to its doubled battery voltage at the same capacity. The reduced current consequently reduces the power dissipation associated with the large input current, thereby enabling the use of standard USB connectors. However, a buck-boost type switching charger is needed to convert the output voltage (e.g., 5 V) of the standard USB to a desired battery charging voltage, which is normally in a range from 5 V to 9 V for a cascaded dual-cell battery.

FIG. 1 illustrates a dual-cell battery charging system. The dual-cell battery charging system comprises two power converters connected in cascade between a first voltage bus VBUS and a second voltage bus VBAT. A first power converter 110 is a buck switching converter. A second power converter 130 is a switched capacitor converter. As shown in FIG. 1, the switched capacitor converter 130 is implemented as a dual-phase switched capacitor converter. A first phase includes switches 133, 134, 135 and 136 connected in series between the second voltage bus VBAT and ground. A first flying capacitor 132 is connected between a common node of switches 133 and 134, and a common node of switches 135 and 136. A common node of the switches 134 and 135 is connected to a third voltage bus BAT. A second phase includes switches 137, 138, 139 and 140 connected in series between the second voltage bus VBAT and ground. A second flying capacitor 142 is connected between a common node of switches 137 and 138, and a common node of switches 139 and 140. A common node of the switches 138 and 139 is connected to the third voltage bus BAT. As shown in FIG. 1, a capacitor 131 is connected between the third voltage bus BAT and ground.

A dual-phase switched capacitor controller 141 is configured to generate gate drive signals for driving switches 133-140. A capacitor 143 is coupled between the second voltage bus VBAT and ground.

The first power converter 110 is implemented as a step-down power converter. The first power converter 110 includes switches 113 and 114 connected in series between an input voltage bus VB and ground. An inductor 116 is connected between a common node of switches 113 and 114, and a system voltage bus VSYS. An output capacitor 117 is connected between the system voltage bus VSYS and ground. A buck switching charger controller 119 is configured to generate gate drive signals for driving switches 113 and 114.

An input capacitor 115 is coupled between the input voltage bus VB and ground. The input voltage bus VB is coupled to another input voltage bus VBUS through a switch 112. The switch 112 is also controlled by the buck switching charger controller 119. The switch 112 is employed to connect the first power converter 110 to the voltage bus VBUS or disconnect the first power converter 110 from the input voltage bus VBUS. In addition, the switch 112 is able to provide a current limiting protection.

The third voltage bus BAT is coupled to the system voltage bus VSYS through a switch 118. The switch 118 is implemented as an isolation switch. In particular, the switch 118 provides isolation between the third voltage bus BAT and the system voltage bus VSYS. As shown in FIG. 1, the bulk terminal of the switch 118 is not connected to the source of the switch 118. The switch 118 includes two diodes. A first diode is between the bulk terminal and the source. A second diode is between the bulk terminal and the drain. These two diodes are back-to-back connected. As a result of having the back-to-back connected diodes, the switch 118 functions as the isolation switch. The buck switching charger controller 119 is configured to generate a gate drive signal for driving the switch 118. The switch 118 is employed to connect the third voltage bus BAT to the first power converter 110 or disconnect the third voltage bus BAT from the first power converter 110.

In operation, when a 5-V power source is provided at the first voltage bus VBUS, the dual-phase switched capacitor converter 130 operates in a 1:2 charge pump mode. The input of the dual-phase switched capacitor converter 130 receives power from the third voltage bus BAT to charge a dual-cell battery coupled to the second voltage bus VBAT. The third voltage bus BAT is the output of the buck switching converter 110. The desired dual-cell charging voltage is achieved by regulating the output (VSYS and BAT) of the buck switching converter 110, and then the voltage on BAT is doubled by the dual-phase switched capacitor converter 130. This power delivery path is applicable to both the constant current mode (CCM) and the constant voltage mode (CVM). Pre-charging is achieved through configuring the switch 118 to operate in a constant current mode and regulating VSYS to a voltage level equal to the minimum system voltage.

In operation, when there is no voltage present at the first voltage bus VBUS, the dual-phase switched capacitor converter 130 operates in a 2:1 charge pump mode to discharge the battery so as to maintain the system supply (VSYS) through turning on the switch 118. While eliminating the need of the expensive buck-boost switching charger, there are some inherent drawbacks of the architecture shown in FIG. 1. First, in both the battery charging mode and the battery discharging mode, the switch 118 is employed to handle both the charging and discharging currents. The current flowing through the switch 118 is high (e.g., 4 A or higher). Such a large current may cause large power losses if the on resistance of the switch 118 is not small enough. Especially during the discharging process, it is important to reduce unnecessary power losses so as to extend the battery operating time. Second, there are many power switches in the battery charging path. The battery charging path includes five switches connected in series. The five switches connected in series may cause low efficiency in the charging process. This low efficiency is undesired in the fast charging because the power losses can heat up the smartphone system, resulting in a longer charging time. Third, there are many external filtering capacitors (seven filtering capacitors) and power switches (twelve power switches) as shown in FIG. 1.

FIG. 2 illustrates a system diagram of the battery charging system shown in FIG. 1. The buck switching converter 210 is similar to the buck switching converter 110 shown in FIG. 1. As shown in FIG. 2, the buck switching converter 210 comprises an input capacitor 211, a switch 212, a capacitor 215, switches 213, 214, an inductor 216, an output capacitor 217, an isolation switch 218, and a buck switching charger controller 219.

The dual-phase switched capacitor converter 230 is similar to the dual-phase switched capacitor converter 130 shown in FIG. 1. As shown in FIG. 2, the dual-phase switched capacitor converter 230 comprises capacitors 231, 232, 242, 243, switches 233, 234, 235, 236, 237, 238, 239, 240 and a dual-phase switched capacitor controller 241.

The battery charging system 200 further includes a wireless direct charging path and a high voltage direct charging path. The wireless direct charging path is from a receiver (Rx) of a wireless power transfer system. As shown in FIG. 2, the output of Rx is connected to VBAT through a charger 260. The charger 260 includes an input capacitor 263, a switch 262 and a linear charger 261. The switch 262 is able to prevent reverse current. In addition, the switch 262 provides a current limit protection. The linear charger 261 is able to provide power for various operating modes including a pre-charge mode, a constant current mode and a constant voltage mode. The output voltage of the wireless direct charging path is a range from about 6 V to about 10 V. The high voltage direct charging path is from a high voltage USB direct charging adaptor. The output voltage of the high voltage direct charging path is a range from about 6 V to about 10 V.

The battery charging system 200 is able to handle the following four charging cases. In a first charging case, a standard 5-V USB adaptor is connected to the input (VBUS) of the battery charging system 200. In a second charging case, the battery charging system 200 is configured to be connected with a low voltage (e.g., from 3.6 V to 5.5 V) USB direct charging adaptor. In a third charging case, the battery charging system 200 is configured to be connected with a high voltage (e.g., from 6 V to 10 V) USB direct charging adaptor. In a fourth charging case, the battery charging system 200 is configured to be connected with a wireless charging input (e.g., a wireless power transfer system). In the fourth charging case, the linear charger 261 is needed. The linear charger 261 is coupled between the output of the wireless receiver and the dual-cell battery 244 to handle wireless fast charging. In all four charging cases, the battery charging system 200 is able to convert the input voltage into a suitable voltage for charging the battery coupled to the battery charging system 200.

The battery charging system 200 further includes a fast charging protocol controller 254. The fast charging protocol controller 254 is configured to detect the current flowing through the dual-cell battery 244 through measuring the voltage across a current sense resistor 245. The fast charging protocol controller 254 also detects the voltages (Vbat+ and Vbat−) across the dual-cell battery 244. Through two communication terminals (D+ and D−), the fast charging protocol controller 254 is able to hand-shake with different direct charging USB adaptors to enable the on/off of the appropriate back-to-back power switches (e.g., switches 252, 253 and 262) to minimize the associated charging power losses.

As power consumption has become more important, there may be a need for simplifying the battery charging systems shown in FIGS. 1-2. More particularly, the power losses caused by the switch (e.g., switch 118 in FIG. 1 or switch 218 in FIG. 2) between the buck switching converter and the switched capacitor converter are quite significant. The battery charging systems shown in FIGS. 1-2 are not efficient. It is desirable to have an efficient battery charging system to perform the functions of the battery charging system described above with respect to FIGS. 1-2.

SUMMARY

These and other problems are generally solved or circumvented, and technical advantages are generally achieved, by preferred embodiments of the present disclosure which provide a multi-cell battery charging system.

In accordance with an embodiment, a method comprises turning on a first group of switches of a switched capacitor converter in a battery charging system to establish a first conductive path, and configuring a system voltage at a system bus to charge a first flying capacitor to a predetermined voltage level through the first conductive path, wherein the predetermined voltage level is less than the system voltage, and turning on a second group of switches of the switched capacitor converter in the battery charging system to establish a second conductive path to charge a battery, wherein a sum of a voltage across the first flying capacitor and the system voltage is applied to the battery.

In accordance with another embodiment, a battery charging system comprises a buck switching converter coupled between a voltage bus and a system voltage bus, a bypassing switch coupled between an input and an output of the buck switching converter, and a switched capacitor converter coupled between the system voltage bus and a battery, wherein an input terminal of the switched capacitor converter is directly connected to an output of the buck switching converter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a battery charging system for charging a multi-cell battery. The invention may also be applied, however, to a variety of power systems. Hereinafter, various embodiments will be explained in detail with reference to the accompanying drawings.

Figure 3:
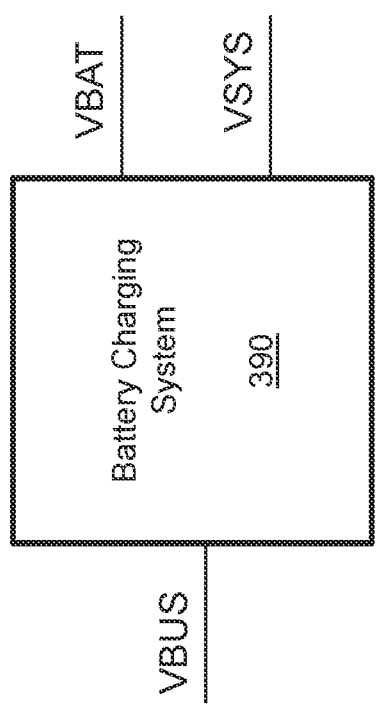
FIG. 3 illustrates a block diagram of a battery charging system in accordance with various embodiments of the present disclosure.

FIG. 3 illustrates a block diagram of a battery charging system in accordance with various embodiments of the present disclosure. The battery charging system 390 has three input/output terminals, namely VBUS, VBAT and VSYS as shown in FIG. 3. In some embodiments, VBUS is configured to be connected with a power source. VBAT is configured to be coupled with a multi-cell battery. VSYS is a system voltage bus configured to provide power for a plurality of system loads of a portable device (e.g., a smart phone).

In some embodiments, VBUS is configured to be connected with a power source having an adjustable output voltage in a range from 6 V to 10 V with a predetermined voltage step, such as a 20-mV step provided by a USB PD3.0 PPS adaptor.

In some embodiments, VBUS is configured to be connected with a power source having a fixed output voltage (e.g., 5 V). Alternatively, VBUS is configured to be connected with a power source having an adjustable output voltage (e.g., from 3.6 V to 5.5 V) with a predetermined voltage step. For example, the power source may be a USB PD3.0 PPS adaptor with a 20-mV step.

In some embodiments, VBAT is connected to a dual-cell battery. Alternatively, VBAT is connected to a three-cell battery. VSYS is connected to the system load that requires a certain voltage range. For example, a smartphone system requires a system supply voltage in a range from 3.5 V to 4.5 V.

The battery charging system 390 includes a buck switching converter, a bypassing switch and a switched capacitor converter. The buck switching converter and the switched capacitor converter are connected in cascade between VBUS and VBAT. More particularly, the buck switching converter is coupled between a voltage bus and a system voltage bus. The bypassing switch is coupled between an input and an output of the buck switching converter. The switched capacitor converter is coupled between the system voltage bus and a battery. An input terminal of the switched capacitor converter is directly connected to an output of the buck switching converter. The detailed implementations of the battery charging system 390 will be described below with respect to FIGS. 4-9.

In operation, the buck switching converter is employed to regulate the voltage at VSYS under various battery charging modes. The bypassing switch is enabled to bypass the power switch and the inductor of the buck switching converter when a direct-to-battery USB charger (a USB with direct charging capability) is plugged into the input terminal at VBUS. The switched capacitor converter is a dual-phase switched capacitor converter. The switched capacitor converter is configured as an open-loop converter operating either in a 2:1 charge pump mode (transferring power from VBAT to VSYS) or a 1:2 charge pump mode (transferring power from VSYS to VBAT).

In operation, the battery charging system may operate in three charging modes, namely a pre-charging mode, a constant current charging mode and constant voltage charging mode. Furthermore, the battery charging system may operate in other operation modes including a battery-only mode, a supplement charge mode and an On-The-Go (OTG) mode.

In the pre-charging mode, the battery is depleted. If the system loads at VSYS are not necessary to be powered up by the depleted battery, the buck switching converter regulates its output to a level slightly more than one half of the battery voltage such that the voltage difference between twice the voltage at VSYS and the depleted battery voltage divided by the path resistance of the switched capacitor converter is equal to the required pre-charging current. On the other hand, the system loads at VSYS need to be powered up by the depleted battery. Under this case, the buck switching converter regulates its output voltage to a level equal to the minimum required system voltage.

In the pre-charging mode, the switched capacitor converter does not operate in in a simple 1:2 charge pump mode. At least one switch of the switched capacitor converter is configured as a current sink to charge a flying capacitor under a controlled speed. The voltage of the flying capacitor voltage is monitored. Once the voltage across the flying capacitor is equal to a predetermined charging headroom voltage plus the difference between the battery voltage and the minimum required system voltage, the charging process of the flying capacitor is terminated. In some embodiments, the predetermined charging headroom voltage is equal to 400 mV. After the charging process of the flying capacitor has been terminated, a sum of the system voltage and the voltage across the flying capacitor is applied to the battery.

During the process of charging the battery, at least one switch of the switched capacitor converter is configured as a current source to control the pre-charging current. Once the headroom voltage across the switch (the switch configured as a current source) decreases to a level equal to a predetermined minimum threshold, the battery pre-charging process terminates and the charging process of the flying capacitor starts again. The cycles described above continue until the battery voltage reaches the threshold for entering the constant current charging mode.

In the constant current charging mode, the buck switching converter regulates the voltage at VSYS. The switched capacitor converter operates in a simple 1:2 step up charge pump mode. If a fixed 5-V input supply is available at VBUS, the buck switching converter regulates the voltage at VSYS such that the difference between twice the voltage at VSYS and the voltage at VBAT divided by the path resistance of the switched capacitor converter is equal to the predetermined constant charging current. If a direct-to-battery USB charger (a USB with direct charging capability) is plugged in, the buck switching converter is turned off and the bypassing power switch is turned on to save the power loss from the buck switching converter. When the bypassing switch is enabled, the output voltage of the USB adaptor is adjusted through the USB fast charging protocols such that the voltage at VSYS keeps the battery charging current constant.

In the constant current charging mode, when the voltage at VSYS reaches one half of the battery regulation voltage, the constant current charging mode terminates. Subsequently, the battery charging system enters into the constant voltage charging mode. It should be noted that the battery regulation voltage is a predetermined voltage for entering into the constant voltage charging mode.

In the constant voltage charging mode, the charging current decreases while the battery is being charged. Once the charging current reaches zero or a predetermined small value, the constant voltage charging period terminates and the battery charging process is complete. In the constant voltage charging mode, the buck switching converter is enabled to regulate the voltage at VSYS to a level equal to one half of the battery regulation voltage.

In operation, when no external power source is coupled to the battery charging system, the battery charging system is configured to operate in a battery-only mode. In the battery-only mode, the switched capacitor converter operates in a 2:1 step-down charge pump mode to supply power from the battery to the system load coupled to VSYS. The voltage at VSYS is equal to one half of the voltage at VBAT.

In operation, when a USB OTG function is enabled, the buck switching converter is configured to operate in a reverse boost mode to supply a 5.1-V or higher OTG voltage at the terminal of VBUS.

Figure 4:
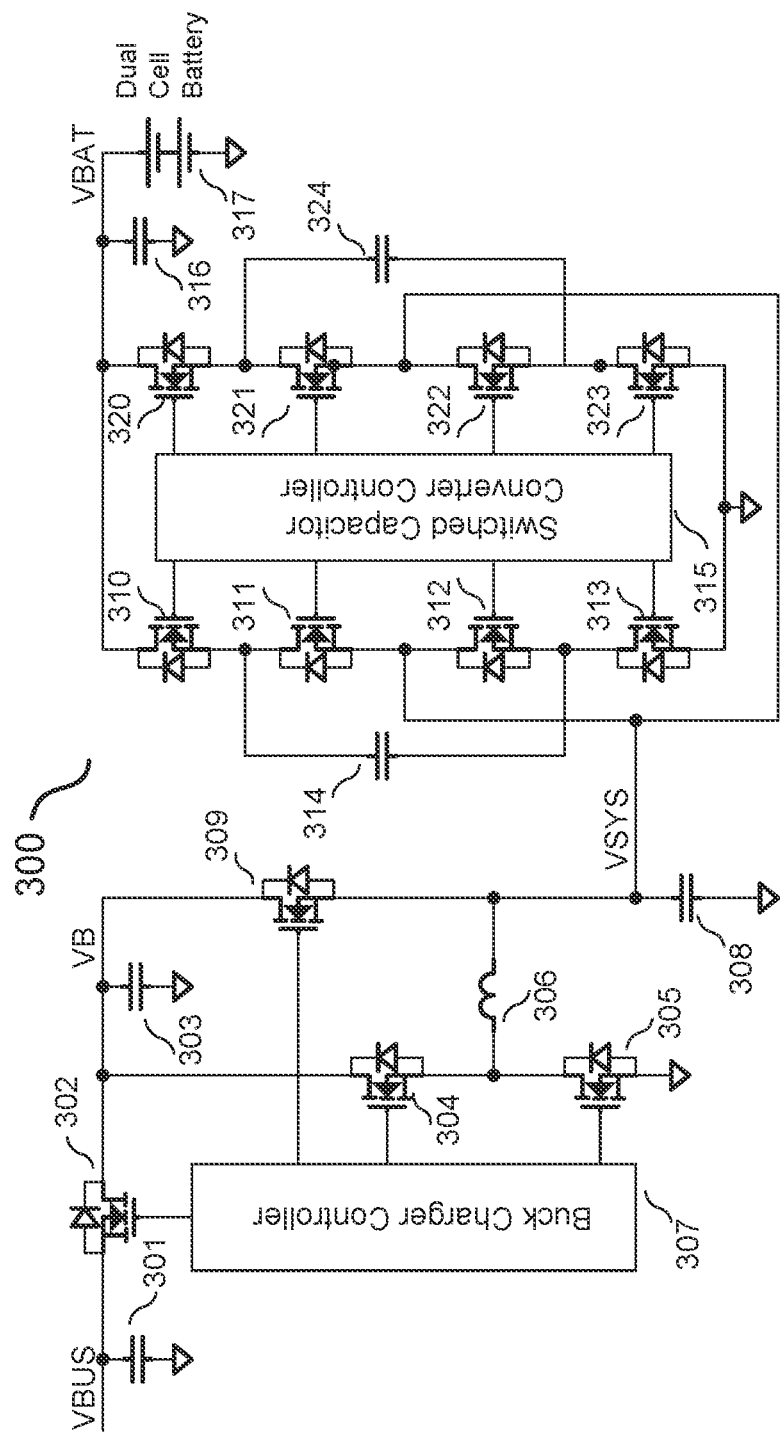
FIG. 4 illustrates a schematic diagram of a first implementation of the battery charging system shown in FIG. 3 in accordance with various embodiments of the present disclosure.

FIG. 4 illustrates a schematic diagram of a first implementation of the battery charging system shown in FIG. 3 in accordance with various embodiments of the present disclosure. The battery charging system 300 comprises three voltage buses, namely VBUS, VBAT and VSYS. In some embodiments, a first voltage bus VBUS is configured to be coupled to a first voltage source. A second voltage bus VBAT is configured to be coupled to a plurality of battery cells 317. In some embodiments, the plurality of battery cells 317 comprises two battery cells connected in series as shown in FIG. 4. A third voltage bus VSYS is configured to be coupled to a plurality of system loads of a mobile device (e.g., a smart phone).

The battery charging system 300 comprises two power converters connected in cascade between the first voltage bus VBUS and a second voltage bus VBAT. A first power converter is a buck switching converter. A second power converter is a switched capacitor converter. More particularly, the second power converter is a dual-phase switched capacitor converter.

As shown in FIG. 4, the first power converter is implemented as a step-down power converter. The first power converter includes switches 304 and 305 connected in series between an input voltage bus VB and ground. An inductor 306 is connected between a common node of switches 304 and 305, and the third voltage bus VSYS. An output capacitor 308 is connected between the third voltage bus VSYS and ground. A buck switching charger controller 307 is configured to generate gate drive signals for driving switches 304 and 305.

An input capacitor 303 is coupled between the input voltage bus VB and ground. The input voltage bus VB is coupled to the first voltage bus VBUS through a switch 302. The switch 302 is also controlled by the buck switching charger controller 307. The switch 302 is employed to connect the first power converter to the first voltage bus VBUS or disconnect the first power converter from the first voltage bus VBUS. In addition, the switch 302 is able to provide a current limiting protection.

As shown in FIG. 4, the switched capacitor converter is implemented as a dual-phase switched capacitor converter. A first phase of the switched capacitor converter includes switches 310, 311, 312 and 313 connected in series between the second voltage bus VBAT and ground. A first flying capacitor 314 is connected between a common node of switches 310 and 311, and a common node of switches 312 and 313. A common node of the switches 311 and 312 is connected to the third voltage bus VSYS.

A second phase of the switched capacitor converter includes switches 320, 321, 322 and 323 connected in series between the second voltage bus VBAT and ground. A second flying capacitor 324 is connected between a common node of switches 320 and 321, and a common node of switches 322 and 323. A common node of the switches 321 and 322 is connected to the third voltage bus VSYS. As shown in FIG. 4, the common node of the switches 321 and 322 is directly connected to the common node of the switches 311 and 312.

A dual-phase switched capacitor controller 315 is configured to generate gate drive signals for driving switches 310-313 and 320-323. A capacitor 316 is coupled between the second voltage bus VBAT and ground.

The battery charging system 300 further comprises a bypassing switch 309. The buck switching converter is not configured as a buck switching charger. The buck switching converter is employed to regulate the voltage at VSYS under various battery charging modes. The bypassing switch 309 is enabled to bypass the switch 304 and the inductor 306 when a direct-to-battery USB charger (a USB with direct charging capability) is plugged into the input terminal at VBUS.

It should be noted that the bypassing switch 309 can be implemented as a standalone device. The standalone device may be a vertical MOSFET. One advantageous feature of having the vertical MOSFET is the efficiency of the battery charging system can be improved because the low on resistance of the vertical MOSFET structure helps to reduce power losses. Furthermore, the cost of the vertical MOSFET is lower than that of a lateral MOSFET under the same rated drain-to-source voltage.

In accordance with an embodiment, the switches of FIG. 4 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 4 shows the switches (e.g., switch 310) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 4 may be implemented as a plurality of switches connected in parallel. Moreover, a capacitor may be connected in parallel with one switch to achieve zero voltage switching (ZVS)/zero current switching (ZCS).

In some embodiments, the operation principles of the battery charging system 300 are described with respect to the following five cases: (1) the battery charging system 300 is configured to charge a depleted battery or a plurality of depleted batteries; (2) the battery charging system 300 is configured to operate in a constant current charging mode; (3) the battery charging system 300 is configured to operate in a constant voltage charging mode; (4) the battery charging system 300 is configured to operate in a battery-only mode; (5) the battery charging system 300 is configured to operate in an OTG mode.

In the first case (charging a depleted battery), when a battery is depleted, the buck switching converter is configured to regulate the voltage at VSYS (the output voltage of the bucking switching converter) to a level equal to a minimum system voltage. The output voltage of the buck switching converter is used to power up the plurality of system loads initially when a dc power source is connected to the first voltage bus VBUS. The switches 310, 311, 312, 313, 320, 321, 322, and 323 of the switched capacitor converter are in the off state. Flying capacitors 314 and 324 are discharged to zero volts. Once the voltage at VSYS is stable, the switches 311 and 321 are fully turned on. The switches 313 and 323 are turned on as current sinks to charge the flying capacitors 314 and 324 respectively by the voltage at VSYS.

It should be noted that the current sink (e.g., switch 313) functions as a resistor of a voltage divider. As a result of having this voltage divider, the voltage across the flying capacitor (e.g., capacitor 314) can be controlled accordingly.

Once the voltages across capacitors 314 and 324 exceed a predetermined threshold, the switches 313 and 323 are turned off, and then switches 311 and 321 are turned off quickly before the switch 312 is turned on. In some embodiments, the predetermined threshold is the difference between the depleted battery voltage and the minimum system voltage. In order to provide enough headroom for charging the battery 317, a predetermined charging headroom voltage (e.g., 400 mV) is added into the predetermined threshold.

Once the switch 312 is fully turned on, the switch 310 can be turned on as a current source with its output current equal to a predetermined pre-charging current. While charging the battery 317, the voltage headroom of the switch 310 is closely monitored. Once the voltage headroom across the switch 310 reaches a predetermined minimum threshold, the switch 310 is turned off, and the switches 311 and 313 are turned on to charge the flying capacitor 314 in a manner as described previously. Meanwhile, the switch 322 is turned on, and then the switch 320 is turned on as a current source to charge the battery in the same manner as described above with respect to the switch 310. Once the voltage headroom across the switch 320 reaches the predetermined minimum threshold, the switches 320 and 322 are turned off, and the switches 321 and 323 are turned on to charge the flying capacitor 324.

In the first case (charging a depleted battery), there are two different charging cycles. In a first charging cycle, the switch 310 functions as a current source to charge the battery 317 as described above. In a second charging cycle, the switch 320 functions as a current source to charge the battery 317 as described above. In the first case, these two charging cycles repeat in an alternating manner until the battery voltage reaches the threshold for having a constant current charging mode. After the battery voltage reaches the threshold, the constant current charging mode starts.

It should be noted that in the first case (charging a depleted battery), the buck switching converter is always enabled to tightly regulate the voltage at VSYS to a level equal to the minimum system voltage regardless of a fixed dc supply or a direct-charging USB fast charging adaptor connected to VBUS.

In the second case (constant current charging mode), if the voltage at VBUS is from a fixed voltage supply, during the constant current charging mode, the battery charging current is constantly monitored to determine the output voltage of the buck switching converter. In particular, the output voltage (VSYS) of the buck switching converter is regulated such that the difference between twice the output voltage (VSYS) and the battery voltage divided by the path resistance of the switched capacitor converter is equal to a preset constant charging current. In some embodiments, the output voltage of the buck switching regulator satisfies the following equation:

$$I_c = \frac{2 \times VSYS - VBAT}{Rp} \quad (1)$$

In Equation (1), $I_C$ is the preset constant charging current; VSYS is the output voltage of the buck switching regulator; VBAT is the battery voltage; $R_P$ is the path resistance of the switched capacitor converter.

In the constant current charging mode, in response to the increase of the battery voltage, the voltage at VSYS increases slowly so as to keep the charging current constant. When a large system load step occurs at VSYS, and the voltage at VSYS drops below one half of the battery voltage, the switched capacitor converter is able to seamlessly leave a 1:2 charge pump mode and enter into a 2:1 charge pump mode to supplement a current to the system loads coupled to VSYS. The current from the battery 317 and the current from the buck switching converter are combined to provide power for the system loads so as to quickly recover the voltage at VSYS. Providing a supplement current from the battery 317 during a system load transient is alternatively referred to as a battery supplement mode. During the time interval of recovering the voltage at VSYS, the current from the battery 317 decreases accordingly after the buck switching converter recovers from the load transient. The battery keeps providing power to the system loads until the buck switching converter is able to provide a current equal to the system load current or the system current decreases so that the system current is fully supported by the buck switching converter. Then, the battery supplement mode ends. The charging process is fully recovered once the VSYS voltage reaches its regulation value.

In the second case (constant current charging mode), if the voltage at VBUS is from a direct-to-battery USB charger (a USB with direct charging capability), then the switch 309 is fully turned on and the switches 304 and 305 are turned off. The voltage at VSYS is supplied directly from the output of the USB. The voltage at VSYS is adjusted using the USB fast charging protocols communicated between the battery charging system 300 and the USB coupled to the battery charging system. The USB is able to adjust the voltage fed into VBUS so as to maintain the charging current equal to the preset constant charging current.

In operation, when the voltage at VSYS reaches one half of the battery regulation voltage, the battery charging system 300 leaves the constant current charging mode and enters into the constant voltage charging mode.

In the third case (constant voltage charging mode), the output voltage of the buck switching converter is tightly regulated to a level equal to one half of the battery regulation voltage. The switched capacitor converter is configured to operate in the 1:2 charge pump mode. In the constant voltage charging mode, the charging current decreases as the battery voltage increases.

It should be noted that a direct-to-battery USB charger (a USB with direct charging capability) may present at VBUS. Under this configuration, the buck switching converter is still on to keep a stable output voltage under various system step load transients. For example, when a system load transient occurs, the buck switching converter is used to achieve fast transient response. The output of the direct-to-battery USB charger is kept constant.

In the constant voltage charging mode, once the charging current is equal to zero or a predetermined small value, the constant voltage charging process is complete. During the constant voltage mode, the battery 317 can operate in the battery supplement mode described above if a large system step load current occurs at VSYS.

Once the charging process finishes, power switches 310, 311, 313, 320, 321 and 323 of the switched capacitor converter are turned off to prevent unnecessary battery discharging due to various system activities. The power switches 312 and 322 are used to keep the flying capacitor 314 and 324 charged. The voltages of the flying capacitors 314 and 324 are periodically monitored. Once the voltages of the flying capacitors 314 and 324 drop below a predetermined threshold, the power switches 312 and 322 are turned off, and the power switches 311, 313, 321, and 323 are partially turned on to recharge the flying capacitors 314 and 424. The buck switching converter remains on to supply the power to the system loads as long as the supply voltage at VBUS presents. Once the voltage at VSYS drops below a predetermined threshold due to system load transients, the switched capacitor converter turns on and enters into the battery supplement mode to supply additional load current to the system loads coupled to VSYS.

In the fourth case (battery-only mode), after the dc supply voltage at VBUS has been removed, the battery charging system 300 may operate in the battery-only mode. In the battery-only mode, the switched capacitor converter is configured to operate in the 2:1 charge pump mode.

It should be noted that in the battery-only mode, the switched capacitor converter always operates and is never turned off unless the battery 317 is completely depleted. In the battery-only mode, the buck switching converter is completely turned off. The switch 302 is employed to prevent the VSYS voltage from presenting at the VBUS terminal while the buck switching converter is off.

In the fifth case (OTG mode), when the USB OTG mode is enabled, the buck switching converter is turned on and operates in a reverse boost mode to maintain a 5.1-V OTG voltage at VBUS. Under the OTG operation mode, the switch 302 functions as an isolation switch to isolate the input of the buck switching converter and the VBUS pin of the USB connector. Once the switch 302 is turned on, the switch 302 also provides the OTG output current limit function.

In FIG. 4, in order to charge a depleted battery, the voltage across the flying capacitor is controlled through configuring at least one switch (e.g., switch 313) as a current sink. Depending on different implementations of handling the voltage difference between the switched converter output voltage and the battery voltage, and maintaining a constant pre-charging current, there are four additional embodiments. These four additional embodiments will be discussed below with respect to FIGS. 5-8.

Figure 5:
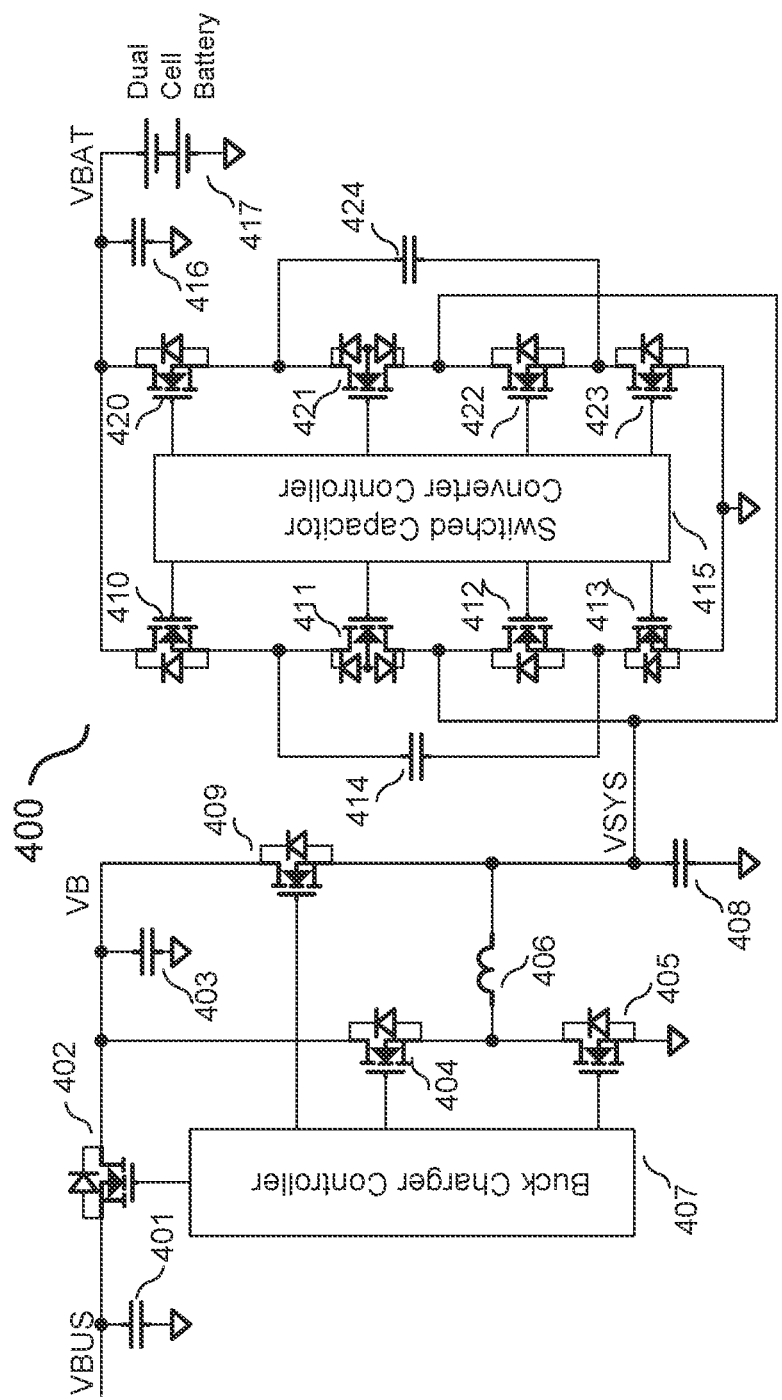
FIG. 5 illustrates a schematic diagram of a second implementation of the battery charging system shown in FIG. 3 in accordance with various embodiments of the present disclosure.
Figure 6:
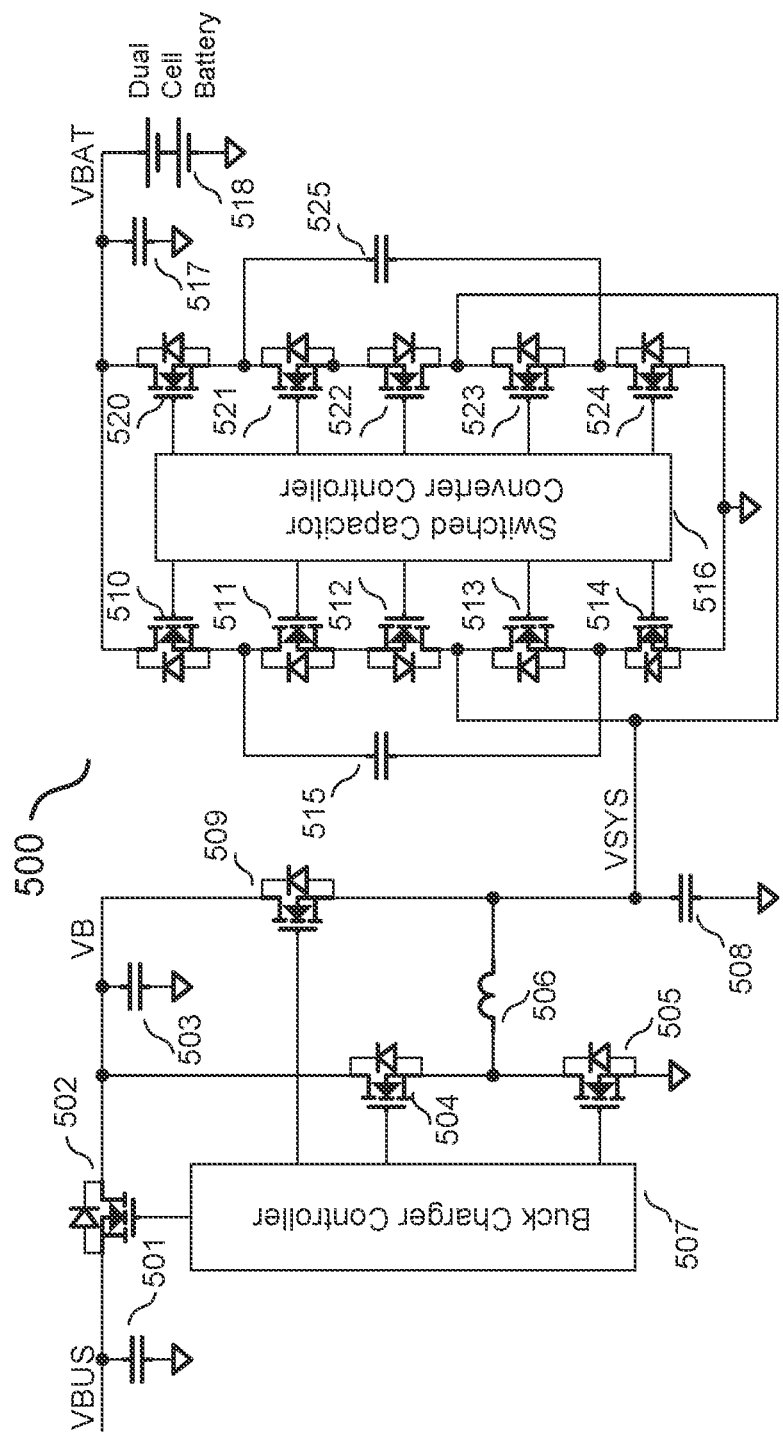
FIG. 6 illustrates a schematic diagram of a third implementation of the battery charging system shown in FIG. 3 in accordance with various embodiments of the present disclosure.
Figure 8:
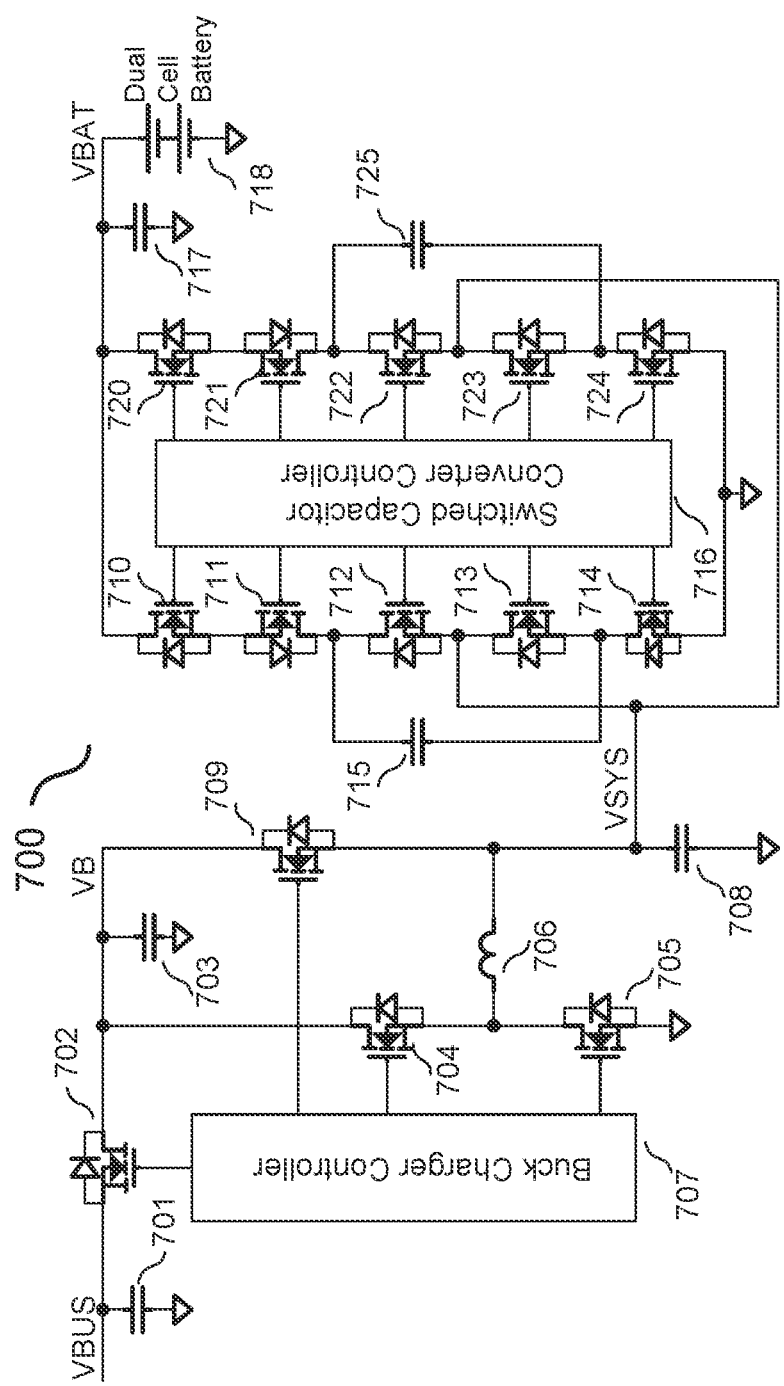
FIG. 8 illustrates a schematic diagram of a fifth implementation of the battery charging system shown in FIG. 3 in accordance with various embodiments of the present disclosure.

It should be noted that the constant current charging mode, the constant voltage charging, the battery-only mode, and the OTG mode of the embodiments shown in FIGS. 5, 6 and 8 are similar to those discussed above with respect to FIG. 4, and hence are not discussed in detail herein.

FIG. 5 illustrates a schematic diagram of a second implementation of the battery charging system shown in FIG. 3 in accordance with various embodiments of the present disclosure. The buck switching converter comprises switches 404, 405, an inductor 406, an input capacitor 403 and an output capacitor 408. The switched capacitor converter comprises switches 410, 411, 412, 413, 420, 421, 422, 423, flying capacitors 414, 424 and filtering capacitors 408, 416. The switched capacitor converter is a dual-phase switched capacitor converter.

The battery charging system 400 further comprises an input capacitor 401, a switch 402, a bypassing switch 409, a buck charger controller 407 and a switched capacitor converter controller 415. The battery charging system 400 shown in FIG. 5 is similar to the battery charging system 300 shown in FIG. 4 except that switches 411 and 421 are implemented as body-switch MOSFETs. For a body-switch MOSFET, each body diode is connected in parallel with a switch. For example, the switch 411 has an upper body diode and a lower body diode. The lower body diode has an anode connected to the drain of the switch 411 and a cathode connected to the source of the switch 411 by turning on the switch connected in parallel with the upper body diode. On the other hand, the upper body diode has an anode connected to the source of the switch 411 and a cathode connected to the drain of the switch 411 by turning on the switch connected in parallel with the lower body diode. As such, the cathode of the body diode can be tied to either the drain terminal or the source terminal of the MOSFET depending on different applications and design needs.

During the pre-charging period (charging a depleted battery), the upper diodes of the switches 411 and 421 are shorted. The anodes of the body diodes (lower body didoes) of the switches 411 and 421 are connected to the drain terminals initially to pre-charge the flying capacitors 414 and 424 respectively to a voltage level equal to the difference between the depleted battery voltage and VSYS. It should be noted that the battery charging voltage headroom should be considered when determining the voltage across the flying capacitor.

During the pre-charge process, the switches 413 and 423 are fully turned on. The switches 411 and 421 are partially turned on to slow down the pre-charging speed of the flying capacitors 414 and 424. Once the voltages across capacitors 414 and 424 reach the pre-determined value, the switches 411 and 421 are turned off while the switches 413 and 423 are still on. Once the switch 411 is off, the anodes of the body diodes of the switch 411 should be detached from both the drain and source terminals for a short moment to turn off the switch 413. Once the switch 413 is off, the lower body diode of the switch 411 is shorted by turning on the switch connected in parallel with the lower body diode. The anode of the upper body diode is connected to the source terminal of the switch 411, and the switches 410 and 412 are turned on. As described above with respect to FIG. 4, in this configuration, the switch 410 functions as a current source configured to generate a predetermined current to pre-charge the battery 417.

Once the voltage headroom of the switch 410 decreases to a predetermined minimum threshold, the switches 410 and 412 are turned off. The switches 411 and 413 are turned on to charge the flying capacitor 414 in the same manner as described above. Meanwhile, the anodes of the body diodes of the switch 421 are detached from both the drain and source terminals of the switch 421 for a short moment to turn off the switch 423. Once the switch 423 is off, the lower body diode of the switch 421 is shorted by turning on the switch connected in parallel with the lower body diode. The anode of the upper body diode is connected to the source terminal of the switch 421, and the switches 420 and 422 are turned on. The switch 420 functions as a current source configured to generate the predetermined current to pre-charge the battery 417. Once the voltage headroom of the switch 420 reaches the predetermined minimum threshold, the switches 420 and 422 are turned off, and the flying capacitor 424 can be charged in the same manner as described previously.

The cycles described above continue in an alternating manner to pre-charge the depleted battery until the battery voltage reaches the threshold to start the constant current charging mode. Once the battery charging system 400 enters the constant current charging mode, the anodes of the body diodes of the switches 411 and 421 are always connected to the respective source terminals. It should be noted that the same body diode position is also applicable to the constant voltage charging mode, the battery-only mode and the OTG mode.

FIG. 6 illustrates a schematic diagram of a third implementation of the battery charging system shown in FIG. 3 in accordance with various embodiments of the present disclosure. The buck switching converter comprises switches 504, 505, an inductor 506, an input capacitor 503 and an output capacitor 508. The switched capacitor converter comprises switches 510, 511, 512, 513, 514, 520, 521, 522, 523, 524, flying capacitors 515, 525 and filtering capacitors 508, 517. The switched capacitor converter is a dual-phase switched capacitor converter.

The battery charging system 500 further comprises an input capacitor 501, a switch 502, a bypassing switch 509, a buck charger controller 507 and a switched capacitor converter controller 516. The battery charging system 500 shown in FIG. 6 is similar to the battery charging system 400 shown in FIG. 5 except that the body-switch MOSFET (e.g., switch 411) is replaced by two MOSFETs (e.g., switches 511 and 512). The operation principle of the battery charging system 500 is similar to that of the battery charging system 400 shown in FIG. 5 except that there is no switching of the cathodes of the body-diodes.

During the charging process of the flying capacitor 515 and 525, the switches 511, 514, 521, and 524 are fully on. The switches 512 and 522 are partially on to slowly charge the flying capacitors 515 and 525 respectively. When the voltages across the capacitors 515 and 525 reach the pre-determined value, the switches 511, 512, 514, 521, 522, and 524 are turned off at the same time. Then, the switches 510 and 513 are turn on to pre-charge the depleted battery 518 in the same manner as described above with respect to FIG. 5. The charging cycles repeats in alternating manner until the battery voltage reaches the constant current charging mode threshold. After reaching the constant current charging mode threshold, the battery charging system 500 enters into the constant current charging mode. Then, power switches 512 and 522 are fully on all the time during the constant current charging mode.

It should be noted that the switches 512 and 522 are fully turned on during other operation modes, such as the constant current charging mode, the constant voltage charging mode, the battery-only mode, and the OTG operation mode.

Figure 7:
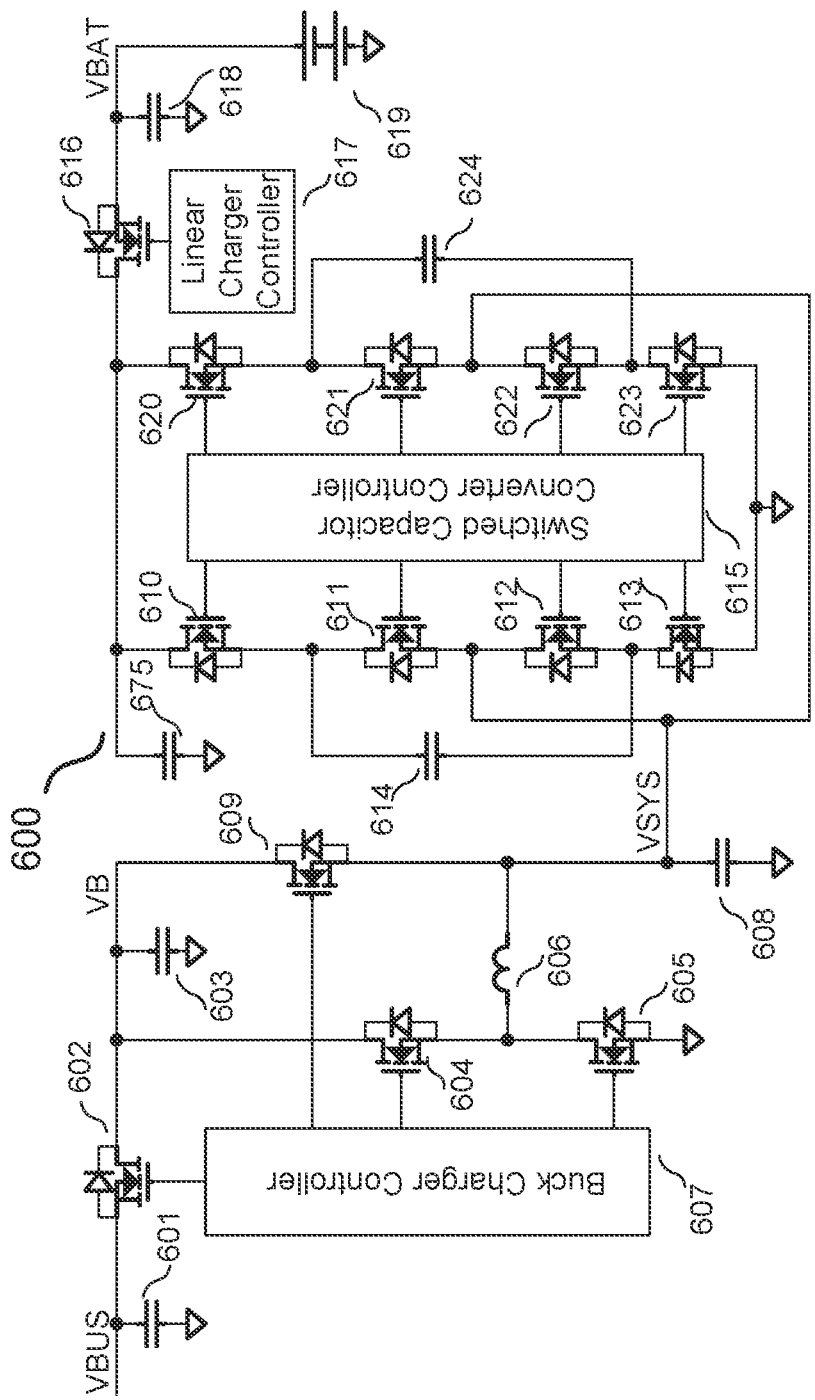
FIG. 7 illustrates a schematic diagram of a fourth implementation of the battery charging system shown in FIG. 3 in accordance with various embodiments of the present disclosure.

FIG. 7 illustrates a schematic diagram of a fourth implementation of the battery charging system shown in FIG. 3 in accordance with various embodiments of the present disclosure. The buck switching converter comprises switches 604, 605, an inductor 606, an input capacitor 603 and an output capacitor 608. The switched capacitor converter comprises switches 610, 611, 612, 613, 620, 621, 622, 623, flying capacitors 614, 624 and filtering capacitors 608, 675. The switched capacitor converter is a dual-phase switched capacitor converter.

The switched capacitor converter always operates in either a 1:2 charge pump mode or a 2:1 charge pump mode depending on whether the battery 619 is in a battery charging mode or a battery supplement mode.

The battery charging system 600 further comprises an input capacitor 601, a switch 602, a bypassing switch 609, a buck charger controller 607 and a switched capacitor converter controller 615. The battery charging system 600 shown in FIG. 7 is similar to the battery charging system 300 shown in FIG. 4 except that a linear regulator is introduced to control the operation of the pre-charging mode, the constant current charging mode, the constant voltage charging mode, the battery supplement mode, the battery-only operation mode and the OTG operation mode. As shown in FIG. 7, the linear charger comprises a switch 616, a linear charger controller 617 and an output filtering capacitor 618.

In operation, if the battery 619 is depleted, the voltage at the input of the linear charger is equal to twice the minimum system voltage. The linear charger operates in the pre-charge mode to charge the battery 619. The battery supplement mode is not allowed during the battery pre-charge period until the battery voltage reaches a voltage level equal to twice the minimum system voltage.

In the constant current charging mode, VSYS is regulated to track the battery voltage. The voltage at VSYS is regulated such that the difference between twice the voltage at VSYS and the battery voltage is greater than or equal to the minimum voltage headroom required to maintain the linear charger as a constant current source.

In the constant current charging mode, if a large system step load occurs at VSYS, and the step load causes VSYS to drop below one half of the battery voltage, the linear charger controller 617 is configured to drive the switch 616 to be fully turned on so that the battery 619 can supplement an additional current to meet the system need. Once the buck switching converter recovers from the transient response, the linear regulator quits the battery supplement mode and resumes the operation of the constant current charging mode.

In operation, if the USB adaptor coupled to the battery charging system 600 is capable of direct-charging (e.g., a direct-to-battery charger), the buck switching converter is turned off once the pre-charging mode finishes, and the switch 609 is turned on to bypass the switch 604 and the inductor 606. The voltage at VBUS is adjusted through the direct-charging protocols such that the output voltage (2×VSYS) of the switched capacitor converter is greater than or equal to the minimum voltage headroom of the linear charger plus the battery voltage so as to maintain the linear charger operating as a current source. In the constant current charging mode, the voltage at VBUS increases as the battery voltage increases.

In operation, once the battery enters the constant voltage charging mode, the voltage at VSYS is regulated to a level equal to one half of the battery regulation voltage, and the linear charger controller 617 can fully turn on the switch 616 to reduce the power dissipation in the switch 616. The buck switching converter is enabled to fully control the voltage at VSYS during the constant voltage charging mode regardless of a fixed dc supply or a direct-charging USB adaptor connected to VBUS.

In operation, if the battery 619 is in a healthy condition and the dc power source at VBUS has been removed, the battery charging system 600 may operate in the battery-only mode. In the battery-only mode, the linear charger controller 617 is configured to drive the switch 616 to be fully turned on, and the switched capacitor converter operates in a 2:1 charge pump mode to supply power to the system loads coupled to VSYS. In the battery-only mode, the buck switching converter is turned off, and the switch 602 is kept off to prevent the voltage at VSYS from reaching VBUS.

In operation, when the USB OTG operation is enabled, the buck switching converter is configured to operate in a reverse boost mode to provide a 5.1 V or higher voltage at VBUS. The switch 602 functions as an enable switch for the OTG mode. Furthermore, the switch 602 is employed to provide a current limit to prevent the battery 619 from being overloaded or shorted by the OTG devices coupled to the battery charging system 600.

FIG. 8 illustrates a schematic diagram of a fifth implementation of the battery charging system shown in FIG. 3 in accordance with various embodiments of the present disclosure. The buck switching converter comprises switches 704, 705, an inductor 706, an input capacitor 703 and an output capacitor 708. The switched capacitor converter comprises switches 710, 711, 712, 713, 714, 720, 721, 722, 723, 724, flying capacitors 715, 725 and filtering capacitors 708, 717. The switched capacitor converter is a dual-phase switched capacitor converter.

The battery charging system 700 further comprises an input capacitor 701, a switch 702, a bypassing switch 709, a buck charger controller 707 and a switched capacitor converter controller 716. The battery charging system 700 shown in FIG. 8 is similar to the battery charging system 300 shown in FIG. 4 except that the top switch is replaced by two MOSFETs. More particularly, the series-connected switches 710 and 711 are used to replace the switch 310 shown in FIG. 4. The series-connected switches 720 and 721 are used to replace the switch 320 shown in FIG. 4.

In this embodiment, the switches 711 and 721 possess two functions. First, the switches 711 and 721 function as current sources to pre-charge the depleted battery 718. Second, the switches 711 and 721 function as simple switches such that the switched capacitor converter can operate in either a 1:2 charge pump mode or a 2:1 charge pump mode.

Since the battery charging system 700 shown in FIG. 8 is similar to the battery charging system 300 shown in FIG. 4, only the pre-charging operation of the battery 718 is described in detail. The operating principles of the other operation modes are similar to those described above with respect to FIG. 4, and hence are not be repeated herein.

In operation, when a dc power source is connected to VBUS, and the battery 718 is depleted, the buck switching converter has a soft start to establish the voltage at VSYS equal to the minimum system voltage. The flying capacitors 715 and 725 are discharged to zero while the switches 710, 711, 712, 713, 714, 720, 721, 722, 723, and 724 are kept off.

Once the voltage at VSYS is stable, the switches 712 and 722 are fully turned on and the switches 714 and 724 are partially turned on to reduce the inrush currents that charge the flying capacitors 715 and 725 respectively.

Once the voltages across the flying capacitors 715 and 722 reach the voltage at VSYS, the switches 712, 714, 722, and 724 are turned off. The switches 710 and 713 are fully turned on while the switch 711 is turned on as a current source to pre-charge the depleted battery with a predetermined charging current. Once the voltage headroom of the switch 711 reaches the minimum voltage headroom threshold, the switches 710, 711, and 713 are turned off, and the switch 712 is fully turned on and the switch 714 is partially turned on to charge the flying capacitor 715 again. Meanwhile, the switches 720 and 723 are fully turned on, and the switch 721 is turned on as a current source to pre-charge the depleted battery. Once the voltage headroom of the switch 721 reaches the minimum voltage headroom threshold, the switches 720, 721, and 723 are turned off, and the switch 722 is fully turned on and the switch 724 is partially turned on to charge the flying capacitor 725 again. At the same time, the switches 710, 711, and 713 are turned on again to pre-charge the depleted battery. The cycles described above repeat in an alternating manner until the battery voltage reaches the constant current charging mode threshold. After the battery voltage reaches the constant current charging mode threshold, the constant current charging mode starts.

Figure 9:
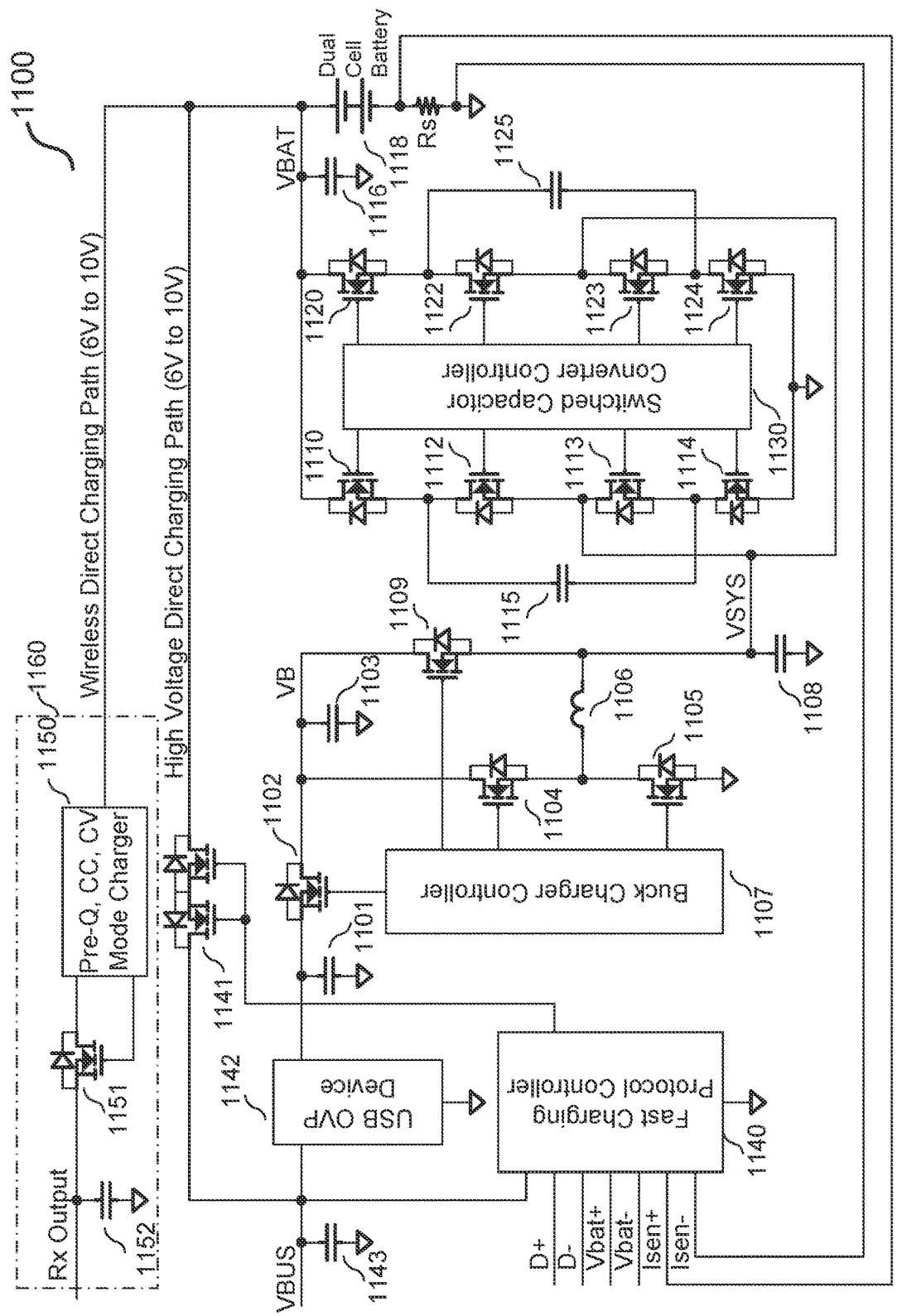
FIG. 9 illustrates a system diagram of the battery charging system shown in FIG. 4 in accordance with various embodiments of the present disclosure.

FIG. 9 illustrates a system diagram of the battery charging system shown in FIG. 4 in accordance with various embodiments of the present disclosure. The buck switching converter comprises switches 1104, 1105, an inductor 1106, an input capacitor 1103 and an output capacitor 1108. The switched capacitor converter comprises switches 1110, 1112, 1113, 1114, 1120, 1122, 1123, 1124, flying capacitors 1115, 1125 and filtering capacitors 1108, 1116. The switched capacitor converter is a dual-phase switched capacitor converter.

The battery charging system 1100 further comprises an input capacitor 1101, a switch 1102, a bypassing switch 1109, a buck charger controller 1107 and a switched capacitor converter controller 1130. The battery charging system 1100 shown in FIG. 9 is similar to the battery charging system 300 shown in FIG. 4.

The battery charging system 1100 has two types of the input sources, namely a USB input and a wireless input. As shown in FIG. 9, the battery charging system 1100 includes a wireless direct charging path, a high voltage direct charging path and a charging path comprising the buck switching converter and the switched capacitor converter.

The wireless direct charging path is from a receiver (Rx) of a wireless power transfer system. As shown in FIG. 9, the output of the receiver (Rx Output) is connected to VBAT through a charger 1160. The charger 1160 includes an input capacitor 1152, a switch 1151 and a linear charger 1150. The switch 1151 is able to prevent reverse current. In addition, the switch 1151 provides a current limit protection. The linear charger 1150 is able to control the current and/or voltage fed into the battery 1118 under various operating modes including a pre-charge mode, a constant current mode and a constant voltage mode. The output voltage of the wireless direct charging path is a range from about 6 V to about 10 V.

The high voltage direct charging path is from a high voltage USB direct charging adaptor. The output voltage of the high voltage direct charging path is a range from about 6 V to about 10 V. The high voltage direct charging path comprises a switch 1141. The switch 1141 comprises two back-to-back connected transistors. The switch 1141 can enable the power source from the USB to be applied to VBAT directly without passing an over voltage protection (OVP) device 1142 to achieve better charging efficiency.

The OVP device 1142 is used to disconnect the USB input power source from the battery charging system 1100 if there is a large surge voltage presenting at the VBUS terminal or the wireless input is selected for providing power to charge the battery 1118.

The battery charging system 1100 is configured to handle at least the following four input power sources. A first input power source is a standard 5-V USB adaptor connected to VBUS. A second input power source is a low voltage (e.g., from 3.6 V to 5.5 V) direct-charging USB adaptor input (e.g., a direct-to-battery USB charger). A third input power source is a high voltage (e.g., from 5 V to 10 V) direct-charging USB adaptor input. A fourth input power source is a wireless charging input.

The control unit 1140 is a fast charging protocol controller. The control unit 1140 is employed to hand-shake with different types of direct-charging USB adaptors to enable the appropriate path in the battery charging system 1100 so as to minimize the associated charging power losses. For example, if a high voltage direct-charging USB adaptor is plugged in, the back-to-back connected power switch 1141 is turned on so that the output of the USB can be connected to the battery 1118 directly. In this system configuration, the switched capacitor converter operates in a 2:1 charge pump mode to supply power to the system loads coupled to VSYS. In this system configuration, both the buck switching converter and the USB OVP device 1142 are kept off.

On the other hand, if a low voltage direct-charging USB adaptor is plugged in, the USB OVP device 1142 and the bypassing switch 1109 are turned on to power up the system voltage at VSYS as well as to charge the battery 1118. Under this system configuration, the switched capacitor converter operates in a 1:2 charge pump mode to charge the battery 1118.

Furthermore, if a fixed 5-V dc power supply or a 5-V USB adaptor is plugged in, the USB OVP device 1142 and the buck switching converter are enabled to power up the system loads coupled to VSYS. Depending on the power level of the power source coupled to VBUS, the switched capacitor converter may operate in either a 1:2 charge pump mode to charge battery 1118 (if the input power is higher than the system power) or a 2:1 charge pump mode to supplement additional power to the system loads (if the input power is less than the system power).

In operation, when the wireless charging is available and selected to provide power for the battery 1118, one additional linear charger 1150 is needed. As shown in FIG. 9, the linear charger 1150 is coupled between the wireless receiver output and the battery 1118. The linear charger 1150 is used to provide fast charging to the battery 1118.

Figure 1:
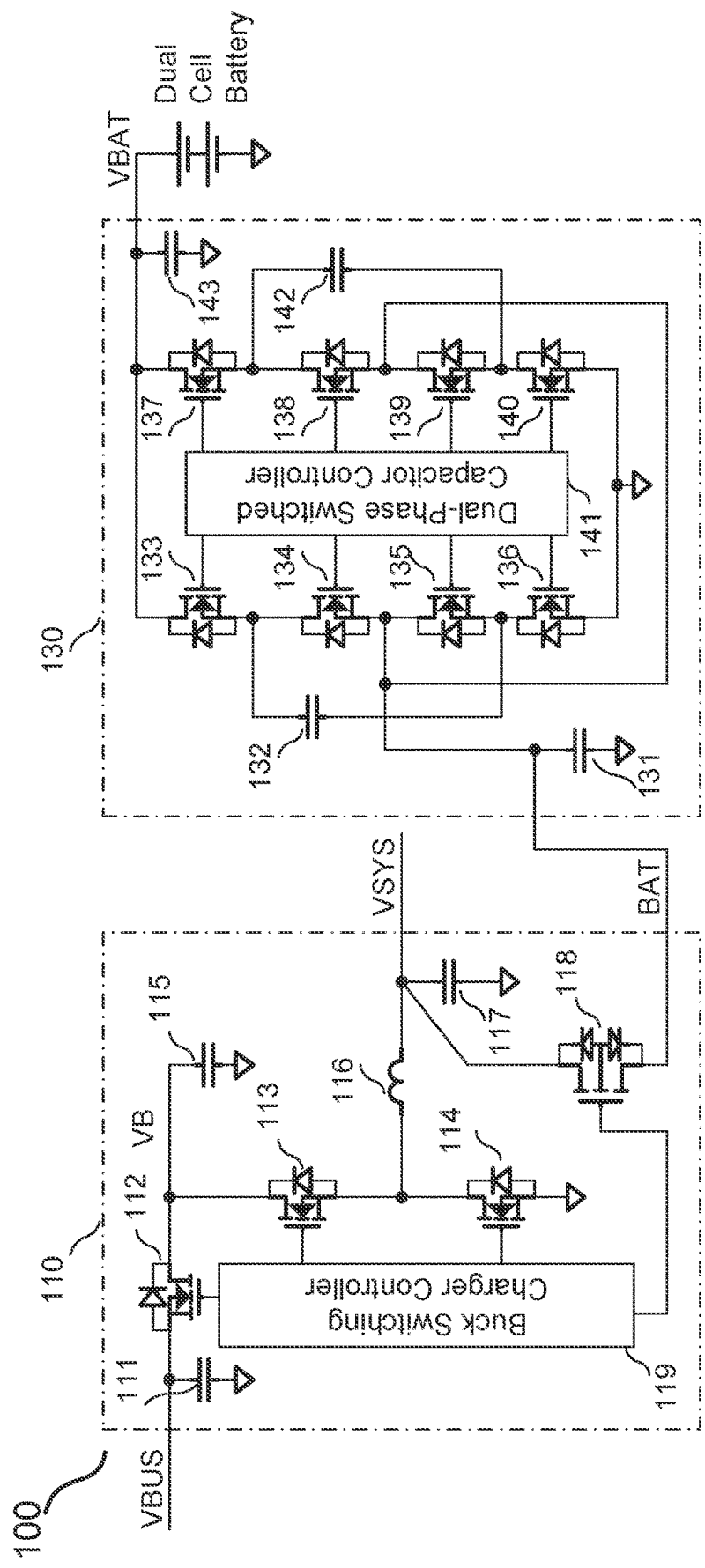
FIG. 1 illustrates a dual-cell battery charging system.
Figure 2:
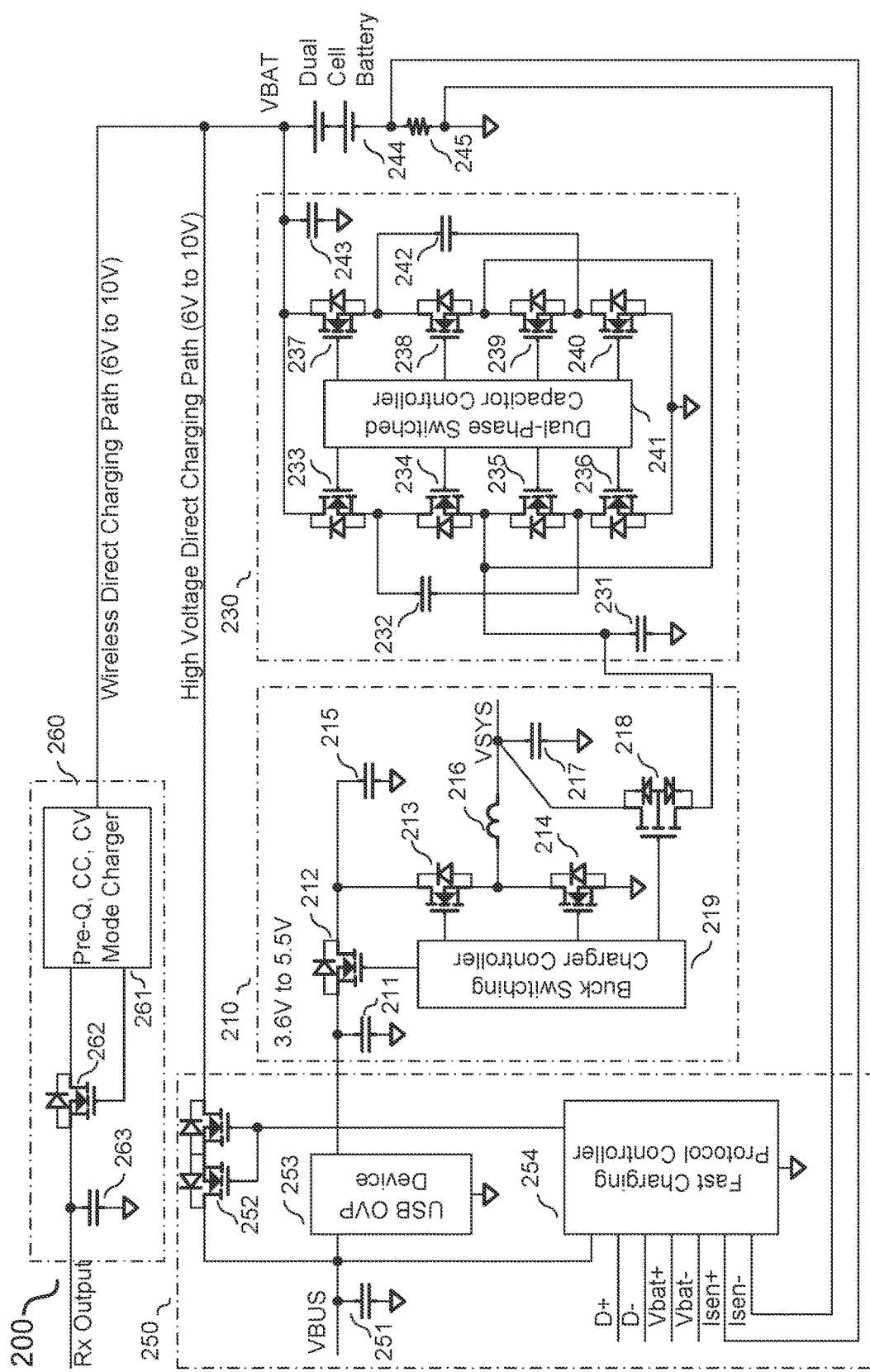
FIG. 2 illustrates a system diagram of the battery charging system shown in FIG. 1.

Referring back to FIG. 2, the power MOSFET 218 in the prior art has been eliminated in FIG. 9. In addition, the bypassing power switch 1109 has been introduced. After having this change, the battery charging system 1100 can handle a large input current from the low voltage direct-charging USB adaptors. For example, if the maximum output current of a low voltage direct-charging USB adaptor is 5 A, the power dissipation in the power switch 1109 is equal to 0.125 watts if the on resistance of the power switch 1109 is equal to 5 mΩ. By contrast, under the same operating condition, the total power dissipation of the buck switching converter shown in FIG. 2 is about 1.375 watts. The total power loss includes 0.250 watts in the power MOSFET 218, 0.5 watts in the power MOSFET 213 and 0.625 watts in the inductor 216. The calculation above is based on the following assumptions: the on resistance of the power MOSFET 218 is 10 mΩ; the on resistance of the power MOSFET 213 is 20 mΩ, and the dc resistance (DCR) of the inductor 216 is 25 mΩ.

It should be noted that the system reset feature of the battery charging system is applicable to all embodiments of the present disclosure. In some embodiments, the system reset feature is carried out by turning off all power switches, and actively discharging the voltages across the flying capacitors and the VSYS voltage to zero. After discharging the voltages to zero, the battery charging system stays at the zero voltage state for a predetermined time interval. In some embodiments, the predetermined time interval is about 500 milliseconds. Then, the battery charging system establishes the voltage at VSYS by turning on the buck switching converter first, and consequently turning on the switched capacitor converter.

In operation, the shipping mode is enabled by turning off all power switches in FIG. 9. The controller 1130 has only a very low quiescent current for supporting the logic circuits to monitor the activity of the ON/OFF switch as well as the voltage at VBUS. Once a valid dc voltage presents at VBUS, or the ON/OFF switch is pressed for a predetermined time period such as two seconds, the battery charging system leaves the shipping mode by either turning on the buck switching converter (if a valid dc supply presents at VBUS) or starting the switched capacitor converter (if a valid dc power supply does not present at VBUS and the battery is heathy).

Figure 10:
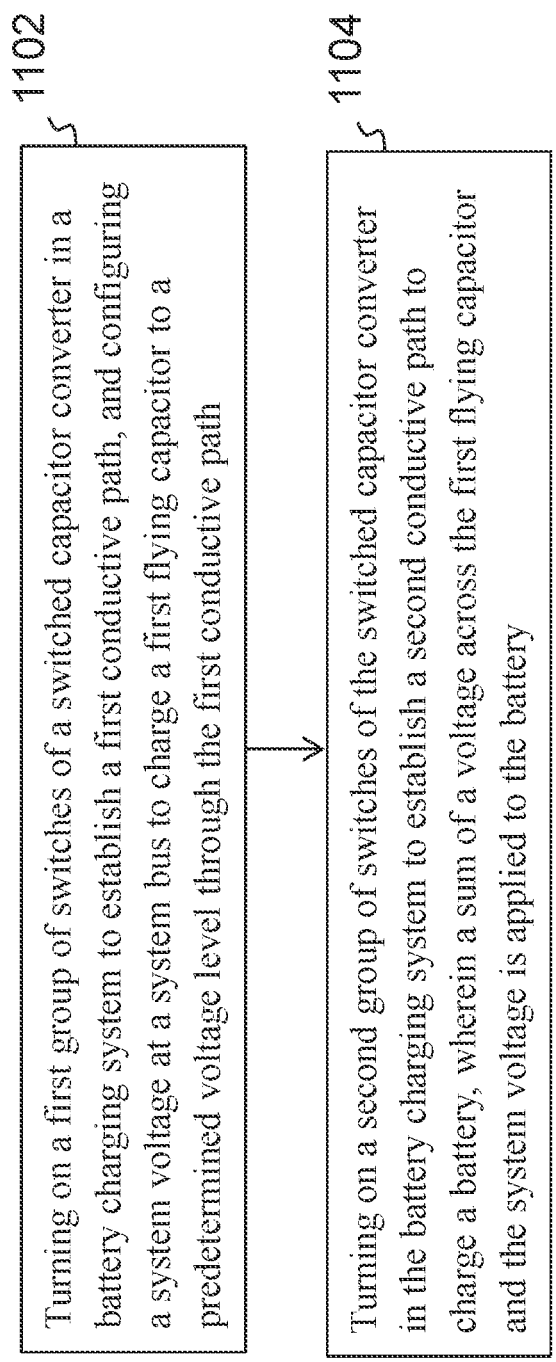
FIG. 10 illustrates a flow chart of a control method for the battery charging systems shown in FIGS. 3-9 in accordance with various embodiments of the present disclosure.

FIG. 10 illustrates a flow chart of a control method for the battery charging systems shown in FIGS. 3-9 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

Referring back to FIG. 4, the battery charging system comprises a buck switching converter, a bypassing switch and a switched capacitor converter. The buck switching converter is coupled between a voltage bus and a system voltage bus. The bypassing switch is coupled between an input and an output of the buck switching converter. The switched capacitor converter is coupled between the system voltage bus and a battery. An input terminal of the switched capacitor converter is directly connected to an output of the buck switching converter.

The battery charger system comprises three input/output terminals. A first input/output terminal is coupled to a power source. Referring back to FIG. 9, the first power source may be from a high voltage direct charging path. Alternatively, the first power source may be from a USB adaptor. In some embodiments, the USB adaptor has a fixed voltage (e.g., 5 V). Alternatively, the USB adaptor has an adjustable voltage (e.g., from 3 V to 5 V). A second input/output terminal is coupled to a battery (e.g., a dual-cell battery). A third input/output terminal is coupled to a system voltage bus configured to provide supply power for various loads.

At step 1102, a first group of switches of the switched capacitor converter in the battery charging system is turned on to establish a first conductive path. A system voltage at the system bus is configured to charge a first flying capacitor to a predetermined voltage level through the first conductive path. The predetermined voltage level is less than the system voltage at the system bus.

At step 1104, a second group of switches of the switched capacitor converter in the battery charging system is turned on to establish a second conductive path to charge a battery. A sum of a voltage across the first flying capacitor and the system voltage is applied to the battery.

Referring back to FIG. 4, the switched capacitor converter comprises a first switch, a second switch, a third switch and a fourth switch connected in series between a first voltage bus and ground, the first voltage bus being coupled to the battery, wherein the first group of switches comprises the second switch and the fourth switch, and the second group of switches comprises the first switch and the third switch, the first flying capacitor connected between a common node of the first switch and the second switch, and a common node of the third switch and the fourth switch, a fifth switch, a sixth switch, a seventh switch and an eighth switch connected in series between the first voltage bus and ground, and a second flying capacitor connected between a common node of the fifth switch and the sixth switch, and a common node of the seventh switch and the eighth switch.

Referring back to FIG. 4, the method further comprises turning on the second switch and configuring the fourth switch as a first current sink to charge the first flying capacitor to the predetermined voltage level, wherein the predetermined voltage level is approximately equal to a predetermined charging headroom voltage plus a difference between a voltage across the battery and the minimum system voltage, turning on the third switch and configuring the first switch as a first current source to charge the battery with a predetermined pre-charge current, and after a voltage across the first switch is less than a predetermined minimum charging headroom voltage, turning off the third switch and the first switch, and turning on the second switch and configuring the fourth switch as the first current sink to charge the first flying capacitor.

Referring back to FIG. 4, the method further comprises turning on the sixth switch and configuring the eighth switch as a second current sink to charge the second flying capacitor to the predetermined voltage level, turning on the seventh switch and configuring the fifth switch as a second current source to charge the battery with the predetermined pre-charge current, and after a voltage across the fifth switch is less than the predetermined minimum charging headroom voltage, turning off the seventh switch and the fifth switch, and turning on the sixth switch and configuring the eighth switch as the second current sink to charge the second flying capacitor.

Referring back to FIG. 4, the first current source and the second current source are configured to provide power for charging the battery in an alternating manner.

Referring back to FIG. 4, the method further comprises during a load transient, configuring the switched capacitor converter to leave a 1:2 charge pump mode and enter a 2:1 charge pump mode, wherein in the 2:1 charge pump mode, the battery is configured to provide power for maintaining the system voltage at the system bus.

Referring back to FIG. 4, the method further comprises during a battery-only mode, configuring the switched capacitor converter to leave a 1:2 charge pump mode and enter a 2:1 charge pump mode, wherein in the 2:1 charge pump mode, the battery is configured to provide power for maintaining the system voltage at the system bus.

Referring back to FIG. 5, the switched capacitor converter comprises a first switch, a second switch, a third switch and a fourth switch connected in series between a first voltage bus and ground, the first voltage bus being coupled to the battery, and wherein the second switch is a first body-switch MOSFET, and wherein the first group of switches comprises the second switch and the fourth switch, and the second group of switches comprises the first switch and the third switch, the first flying capacitor connected between a common node of the first switch and the second switch, and a common node of the third switch and the fourth switch, a fifth switch, a sixth switch, a seventh switch and an eighth switch connected in series between the first voltage bus and ground, and wherein the sixth switch is a second body-switch MOSFET, and a second flying capacitor connected between a common node of the fifth switch and the sixth switch, and a common node of the seventh switch and the eighth switch.

Referring back to FIG. 5, the method further comprises turning on the fourth switch and partially turning on the second switch to charge the first flying capacitor to the predetermined voltage level after configuring an anode of a body diode of the second switch to be connected to a drain of the second switch, wherein the predetermined voltage level is approximately equal to a predetermined charging headroom voltage plus a difference between a voltage across the battery and the minimum system voltage, after a voltage across the first flying capacitor reaches the predetermined voltage level, turning off the second switch, during a turn-off process of the fourth switch, detaching the anode of the body diode of the second switch from the drain and a source of the second switch for a predetermined moment, after the fourth switch has been turned off, configuring the anode of the body diode of the second switch to be connected to the source of the second switch, turning on the third switch and configuring the first switch as a first current source to charge the battery with a predetermined pre-charge current, and after a voltage across the first switch is less than a predetermined minimum charging headroom voltage, turning off the third switch and the first switch, and turning on the fourth switch and partially turning on the second switch to charge the first flying capacitor.

Referring back to FIG. 6, the switched capacitor converter comprises a first switch, a second switch, a third switch, a fourth switch and a fifth switch connected in series between a first voltage bus and ground, the first voltage bus being coupled to the battery, and wherein the second switch and the third switch are back-to-back connected to each other, and wherein the first group of switches comprises the second switch, the third switch and the fifth switch, and the second group of switches comprises the first switch and the fourth switch, the first flying capacitor connected between a common node of the first switch and the second switch, and a common node of the fourth switch and the fifth switch, a sixth switch, a seventh switch, an eighth switch, a ninth switch and a tenth switch connected in series between the first voltage bus and ground, and wherein the seventh switch and the eighth switch are back-to-back connected to each other, and a second flying capacitor connected between a common node of the sixth switch and the seventh switch, and a common node of the ninth switch and the tenth switch.

Referring back to FIG. 6, the method further comprises turning on the second switch, the fifth switch and partially turning on the third switch to charge the first flying capacitor to the predetermined voltage level, wherein the predetermined voltage level is approximately equal to a predetermined charging headroom voltage plus a difference between a voltage across the battery and the minimum system voltage, after a voltage across the first flying capacitor reaches the predetermined voltage level, turning off the second switch, the third switch and the fifth switch, turning on the fourth switch and configuring the first switch as a first current source to charge the battery with a predetermined pre-charge current, and after a voltage across the first switch is less than a predetermined minimum charging headroom voltage, turning off the fourth switch and the first switch, and turning on the second switch, the fifth switch and partially turning on the third switch to charge the first flying capacitor.

Referring back to FIG. 8, the switched capacitor converter comprises a first switch, a second switch, a third switch, a fourth switch and a fifth switch connected in series between a first voltage bus and ground, the first voltage bus being coupled to the battery, and wherein the first switch and the second switch are back-to-back connected to each other, and wherein the first group of switches comprises the third switch and the fifth switch, and the second group of switches comprises the first switch, the second switch and the fourth switch, the first flying capacitor connected between a common node of the second switch and the third switch, and a common node of the fourth switch and the fifth switch, a sixth switch, a seventh switch, an eighth switch, a ninth switch and a tenth switch connected in series between the first voltage bus and ground, and wherein the sixth switch and the seventh switch are back-to-back connected to each other, and a second flying capacitor connected between a common node of the seventh switch and the eighth switch, and a common node of the ninth switch and the tenth switch.

Referring back to FIG. 8, the method further comprises turning on the third switch and partially turning on the fifth switch to charge the first flying capacitor to a level equal to the minimum system voltage, after a voltage across the first flying capacitor reaches the minimum system voltage, turning off the third switch and the fifth switch, turning on the first switch, the fourth switch and configuring the second switch as a first current source to charge the battery with a predetermined pre-charge current, and after a voltage across the second switch is less than a predetermined minimum charging headroom voltage, turning off the first switch, the second switch and the fourth switch, and turning on the third switch and partially turning on the fifth switch to charge the first flying capacitor.

Figure 11:
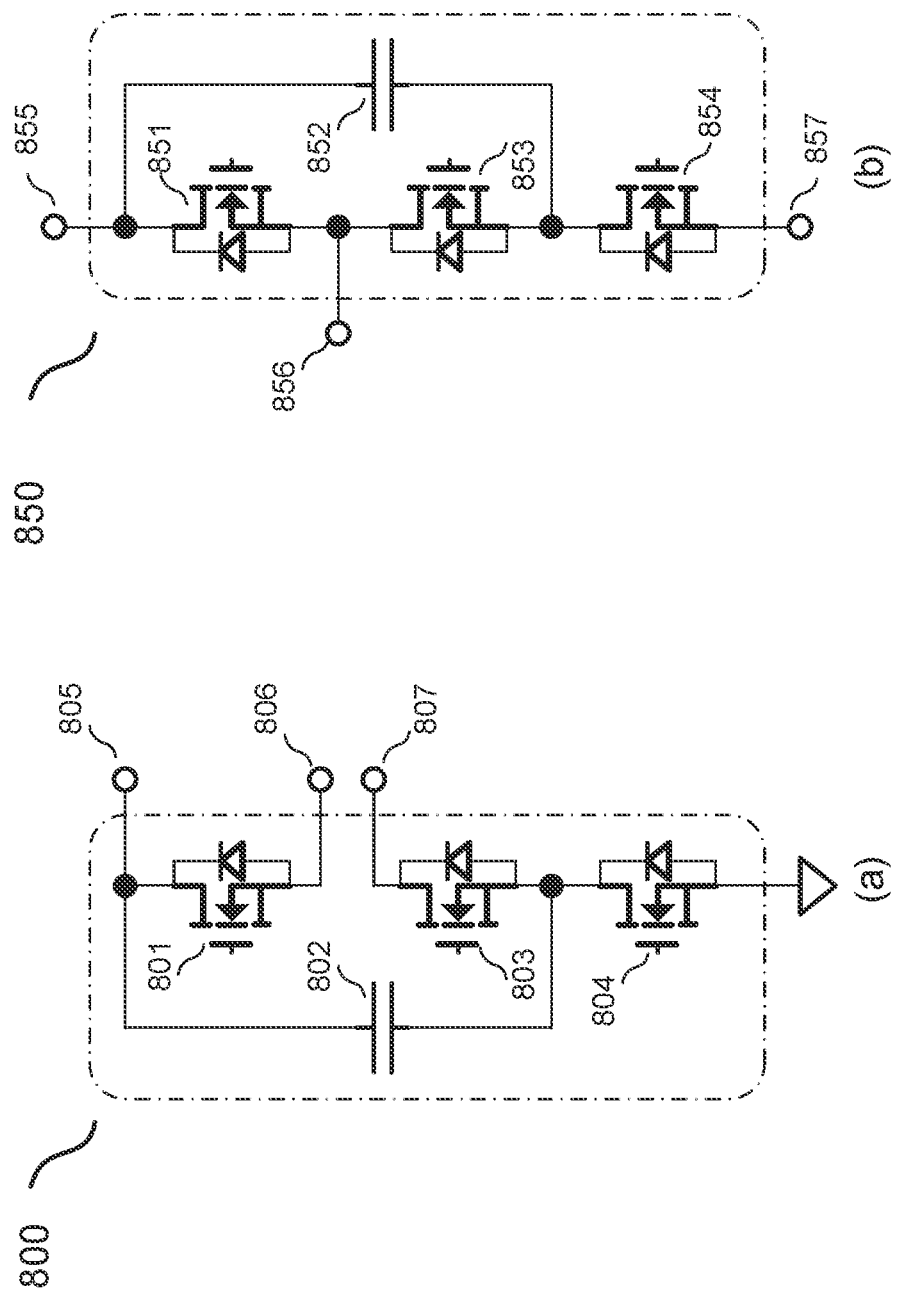
FIG. 11 illustrates two voltage conversion ratio adjustment devices in accordance with various embodiments of the present disclosure.

FIG. 11 illustrates two voltage conversion ratio adjustment devices in accordance with various embodiments of the present disclosure. A first voltage conversion ratio adjustment device 800 comprises a first switch 801, a second switch 803, a third switch 804 and a first capacitor 802. As shown in FIG. 11, the first voltage conversion ratio adjustment device 800 has three terminals. A first terminal 805 is connected to a drain of the first switch 801. A second terminal 806 is connected to a source of the first switch 801. A third terminal 807 is connected to a drain of the second switch 803. As shown in FIG. 11, the second switch 803 and the third switch 804 are connected in series between the third terminal 807 and ground. The first capacitor is connected between the first terminal 805 and a common node of the second switch 803 and the third switch 804.

A second voltage conversion ratio adjustment device 850 comprises a fourth switch 851, a fifth switch 853, a sixth switch 854 and a second capacitor 852. As shown in FIG. 11, the second voltage conversion ratio adjustment device 850 has three terminals. A first terminal 855 is connected to a drain of the fourth switch 851. A second terminal 856 is connected to a source of the fourth switch 851. A third terminal 857 is connected to a source of the sixth switch 854. As shown in FIG. 11, the fourth switch 851, the fifth switch 853 and the sixth switch 854 are connected in series between the first terminal 855 and the third terminal 857. The second capacitor is connected between the first terminal 855 and a common node of the fifth switch 853 and the sixth switch 854.

The voltage conversion ratio adjustment devices shown in FIG. 11 can be used to expand the voltage conversion ratio of the switched capacitor converter from 1:2 to 1:N, or from 2:1 to N:1. By using the voltage conversion ratio adjustment devices shown in FIG. 11, the battery charging systems in various embodiments of the present disclosure can be used to charge batteries having N-cells connected in series. N is an integer.

In some embodiments, N is equal to three. The battery is a three-cell battery. The voltage conversion ratio adjustment devices shown in FIG. 11 are combined with the embodiment shown in FIG. 4 to obtain battery charging systems for charging a three-cell battery.

It should be noted that the battery charging systems for charging a three-cell battery are provided for illustrative purposes only. One of ordinary of skill in the art will realize that the voltage conversion ratio adjustment devices shown in FIG. 11 can be used to build a battery charging system for charging an N-cell battery.

Figure 12:
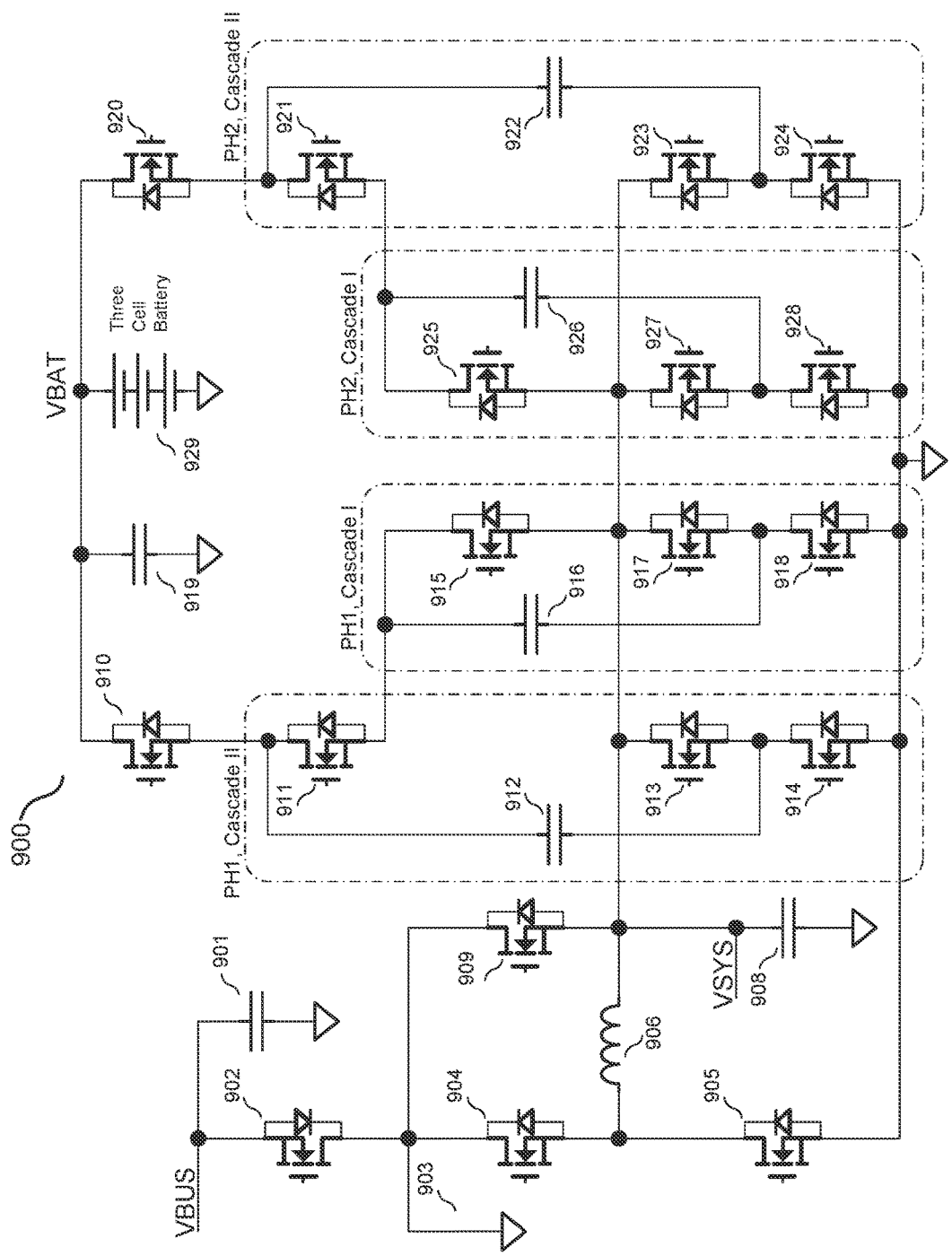
FIG. 12 illustrates a battery charging system for charging a three-cell battery in accordance with various embodiments of the present disclosure.

FIG. 12 illustrates a battery charging system for charging a three-cell battery in accordance with various embodiments of the present disclosure. The buck switching converter comprises switches 904, 905, an inductor 906, an input capacitor 903 and an output capacitor 908. The switched capacitor converter comprises switches 910, 911, 913, 914, 915, 917, 918, 920, 921, 923, 924, 925, 927, and 928, the flying capacitors 912, 916, 922, and 926, the filtering capacitors 908 and 919.

The ratio of the voltage at VBAT to the voltage at VSYS is 3:1. It is a 3:1 Dickson switched capacitor converter when the supply is from the battery 929. The operation of the 3:1 Dickson switched capacitor converter is well known in the art, and hence is not discussed in detail herein.

In operation, when the battery charging system 900 operates in the constant current charging mode, the constant voltage charging mode, the battery-only mode and the OTG mode, the switched capacitor converter operates the same way as the Dickson switched capacitor converter to provide either a 3:1 voltage step down ratio (when discharging the battery) or a 1:3 voltage step up ratio (when charging the battery).

The switched capacitor converter operates in the operation modes described above with respect to FIGS. 4-8 if the battery is depleted. The operation of charging the depleted battery depends on the actual voltage of the depleted battery and the minimum system voltage. Initially, the buck switching converter and the switched capacitor converter are off with all flying capacitors 912, 916, 922, and 926 discharged to zero under the depleted battery and no dc input coupled to VBUS. When a valid dc voltage presents at VBUS, the buck switching converter is turned on. The buck switching converter regulates the voltage at VSYS to a level equal to the minimum system voltage. Once the voltage at VSYS is stable, the switched capacitor converter starts. If the depleted battery voltage is greater than the voltage at VSYS, and less than twice the voltage at VSYS (the voltage at VSYS is the minimum system voltage), power switches 911, 914, 915, 918, 921, 924, 925 and 928 are turned on to pre-charge the flying capacitors 912, 916, 922 and 926. More particularly, power switches 914, 918, 924 and 928 function as constant current sources to charge the capacitors 912, 916, 922 and 926 respectively in a controlled manner. Once voltages across the capacitors 912, 916, 922 and 926 are equal to the difference between the voltage at VBAT and the voltage at VSYS plus a predetermined voltage (e.g., 400 mV), the charging process of the flying capacitors is terminated by turning off power switches 914, 915, 918, 924, 925, and 928. Then power switches 910, 913, and 917 are turned on. The power switch 910 functions as a constant current source to pre-charge the depleted battery at a predetermined current.

While pre-charging the battery, the voltage headroom of the power switch 910 decreases. Once the voltage headroom reaches the predetermined minimum voltage headroom threshold, power switches 910, 913, and 917 are turned off, and power switches 914, 915 and 918 are turned on again to charge the flying capacitors 912 and 916 in a manner described previously. Meanwhile, power switches 923 and 927 are fully turned on. The power switch 920 operates as a current source to pre-charge the battery at a predetermined current. The voltage headroom of the power switch 920 decreases while charging the battery. Once the voltage headroom reaches the predetermined minimum voltage headroom threshold, power switches 920, 923, and 927 are turned off, and power switches 924, 925 and 928 are turned on to charge the flying capacitors 922 and 926 in a manner described previously. At the same time, power switches 910, 913, and 917 are turned on again to continuously pre-charge the battery in a manner described previously. During this operation mode, power switches 911 and 921 are kept on all the time.

The cycles continue in an alternating manner until the battery voltage reaches a level equal to twice the minimum system voltage. When the battery voltage is greater than or equal to twice but less than three times of the minimum system voltage, the switched capacitor converter operates in different operation modes to pre-charge or continue to pre-charge the depleted battery. Under such a battery voltage condition, the switched capacitor converter operates according to the following control method. As described previously, power switches 915, 918, 925, and 928 are turned on to charge the flying capacitors 916 and 926 initially once the voltage at VSYS is stable. When the voltages across the flying capacitors 916 and 926 reach the voltage value at VSYS, power switches 915, 918, 925, and 928 are turned off. Power switches 911, 914, 917, 921, 924, and 927 are turned on to charge the flying capacitors 912 and 922 respectively. Power switches 914 and 924 function as current sources to charge the flying capacitors 912 and 922 respectively in a well-controlled manner. Once the voltages across the flying capacitors 912 and 922 are equal to the difference between the minimum system voltage and the depleted battery voltage plus a predetermined voltage (e.g., 400 mV), power switches 911, 914, 917, 921, 924, and 927 are turned off. Then power switches 910 and 913 are turned on to pre-charge the depleted battery through the flying capacitor 912. Meanwhile power switches 915 and 918 are turned on to charge the flying capacitor 916 again. As stated previously, the power switch 910 may function as a current source to pre-charge the battery at a predetermined current value. The voltage headroom of the power switch 910 decreases while pre-charging the battery. Once the voltage headroom reaches the predetermined minimum voltage headroom, power switches 910 and 913 are turned off, and power switches 911, 914, and 917 are turned on again to charge the flying capacitor 912 again in a manner described previously. At the same time, power switches 920 and 923 are turned on to continue to pre-charge the battery while power switches 925 and 928 are turned on again to charge the flying capacitor 926. Once the voltage headroom of the power switch 920 reaches the predetermined minimum voltage headroom threshold, power switches 920, 923, 925, and 928 are turned off and power switches 921, 924, and 927 are turned on again to charge the flying capacitor 922 in a manner described previously. The switches 910 and 913 are turned on to continuously pre-charge the battery, and power switches 915 and 918 are turned on again to charge the flying capacitor 916. The charging cycles continue in an alternating manner until the battery voltage reaches the threshold to start the constant current charging mode.

Figure 13:
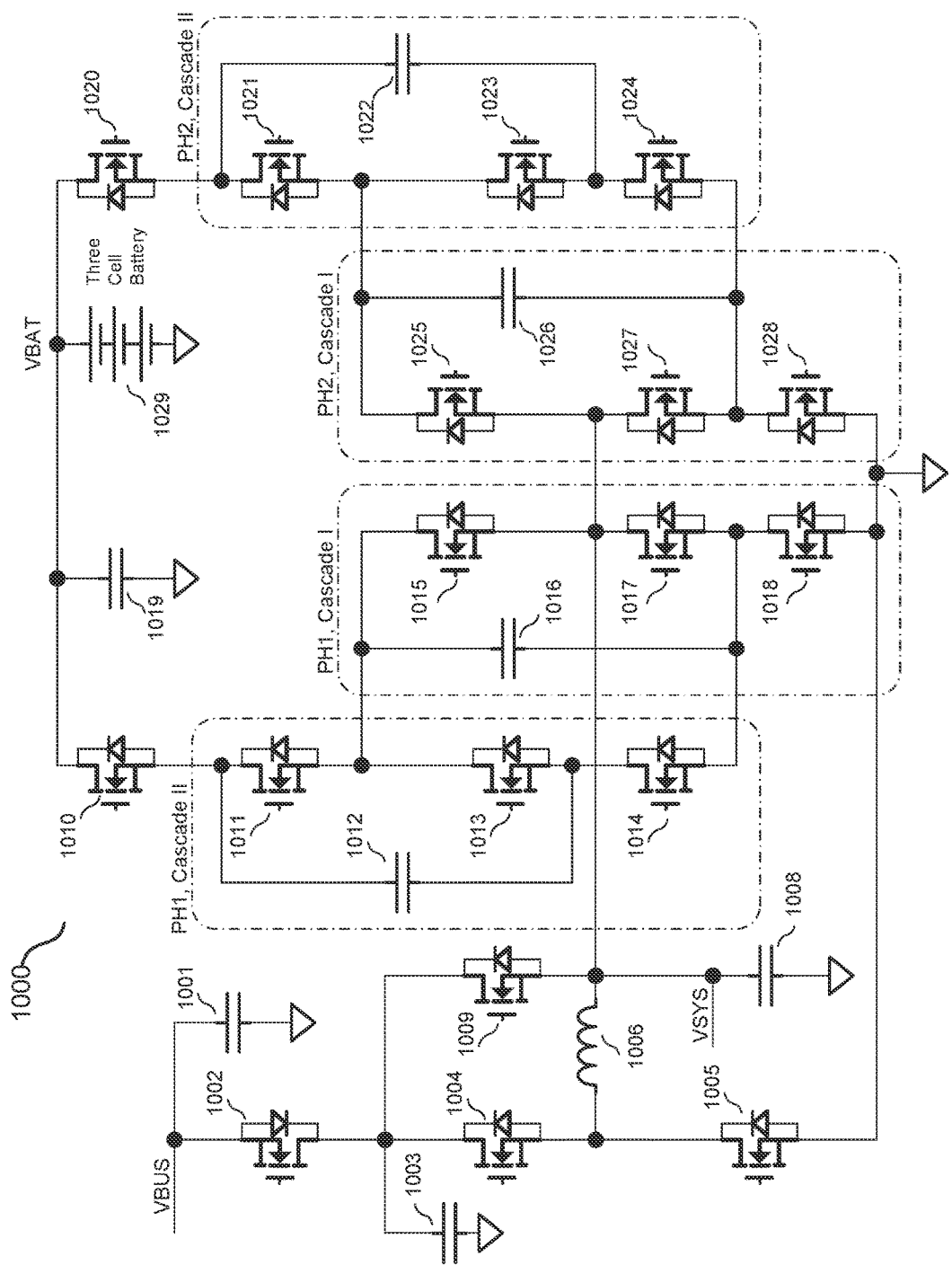
FIG. 13 illustrates another battery charging system for charging a three-cell battery in accordance with various embodiments of the present disclosure.

FIG. 13 illustrates another battery charging system for charging a three-cell battery in accordance with various embodiments of the present disclosure. The buck switching converter comprises switches 1004, 1005, an inductor 1006, an input capacitor 1003 and an output capacitor 1008. The switched capacitor converter comprises switches 1010, 1011, 1013, 1014, 1015, 1017, 1018, 1020, 1021, 1023, 1024, 1025, 1027, and 1028, the flying capacitors 1012, 1016, 1022, 1026, the filtering capacitors 1008 and 1019.

The ratio of the voltage at VBAT to the voltage at VSYS is 3:1. It is a 3:1 series-parallel switched capacitor converter when the supply is from battery. The operation of the series-parallel 3:1 switched capacitor converter is well known in the art, and hence is not discussed herein.

In operation, when the battery charging system operate in the constant current charging mode, the constant voltage charging mode, the battery-only mode and the OTG mode, the switched capacitor converter operates the same way as the series-parallel switched capacitor converter to provide either a 3:1 voltage step down ratio (when discharging the battery) or a 1:3 voltage step up ratio (when charging the battery).

The switched capacitor converter operates in the operation modes described above with respect to FIGS. 4-8 if the battery is depleted. The operation of charging the depleted battery depends on the actual voltage of the depleted battery and the minimum system voltage. Initially, the buck switching converter and the switched capacitor converter are off with all flying capacitors 1012, 1016, 1022, and 1026 discharged to zero under the depleted battery and no dc input coupled to VBUS. When a valid dc voltage presents at VBUS, the buck switching converter is turned on. The buck switching converter regulates the voltage at VSYS to a level equal to the minimum system voltage. Once the voltage at VSYS is stable, the switched capacitor converter starts. If the depleted battery voltage is greater than the voltage at VSYS, and less than twice the voltage at VSYS (the voltage at VSYS is the minimum system voltage), power switches 1015, 1018, 1025 and 1028 are turned on to pre-charge the flying capacitors 1016 and 1026. More particularly, power switches 1018 and 1028 function as constant current sources to charge the capacitors 1016 and 1026 respectively in a controlled manner. Once voltages across the capacitors 1016 and 1026 are equal to the difference between the voltage at VBAT and the voltage at VSYS plus a predetermined value (e.g., 400 mV), the charging process of the flying capacitors is terminated by turning off power switches 1015, 1018, 1025, and 1028. Then power switches 1010, 1011, and 1017 are turned on. The power switch 1010 functions as a constant current source to pre-charge the depleted battery at a pre-determined current.

While pre-charging the battery, the voltage headroom of the power switch 1010 decreases. Once the voltage headroom reaches the predetermined minimum voltage headroom threshold, power switches 1010, 1011, and 1017 are turned off, and power switches 1015 and 1018 are turned on again to charge the flying capacitor 1016 in a manner described previously. Meanwhile, power switches 1021 and 1027 are fully turned on. The power switch 1020 operates as a current source to pre-charge the battery at a predetermined current. The voltage headroom of the power switch 1020 decreases while charging the battery. Once the voltage headroom reaches the predetermined minimum voltage headroom threshold, power switches 1020, 1021, and 1027 are turned off, and power switches 1025 and 108 are turned on to charge the flying capacitor 1026 in a manner described previously. At the same time, power switches 1010, 1011, and 1017 are turned on again to continuously pre-charge the battery in a manner described previously.

The cycles continue in an alternating manner until the battery voltage reaches a level equal to twice the minimum system voltage. When the battery voltage is greater than or equal to twice but less than three times of the minimum system voltage, the switched capacitor converter operates in different operation modes to pre-charge or continue to pre-charge the depleted battery. Under such a battery voltage condition, the switched capacitor converter operates according to the following control method. Power switches 1011, 1014, 1015, 1018, 1021, 1024, 1025, and 1028 are turned on to charge the flying capacitors 1012, 1016, 1022, and 1026 initially once the voltage at VSYS is stable. When the voltages across the flying capacitors 1012, 1016, 1022, and 1026 reach the value equal to (VBAT-VSYS)/2 plus a predetermined voltage (e.g., 400 mV), power switches 1011, 1014, 1015, 1018, 1021, 1024, 1025, and 1028 are turned off. Power switches 1010, 1013, and 1017 are turned on to pre-charge the depleted battery with a pre-determined current. The power switch 1010 functions as a current source to control the pre-charging current. The voltage headroom of the power switch 1010 decreases while pre-charging the battery. Once the voltage headroom reaches the predetermined minimum voltage headroom, power switches 1010, 1013, and 1017 are turned off, and power switches 1011, 1014, 1015, and 1018 are turned on to charge the flying capacitors 1012 and 1016 again in a manner described previously. Meanwhile power switches 1020, 1023, and 1027 are turned on to continue to pre-charge the depleted battery with a predetermined current. The voltage headroom of the power switch 1020 decreases while pre-charging the battery. Once the voltage headroom reaches the predetermined minimum voltage headroom, power switches 1020, 1023, and 1027 are turned off and power switches 1021, 1024, 1025, and 1028 are turned on to charge the flying capacitors 1022 and 1026 respectively again in a manner described previously. At the same time, power switches 1010, 1013, and 1017 are turned on again to continue the battery pre-charging. The charging cycles continue in an alternating manner until the battery voltage reaches the threshold to start the constant current charging mode.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    turning on a first group of switches of a switched capacitor converter in a battery charging system to establish a first conductive path, and configuring a system voltage at a system bus to charge a first flying capacitor to a predetermined voltage level through the first conductive path, wherein the predetermined voltage level is less than the system voltage; and
    turning on a second group of switches of the switched capacitor converter in the battery charging system to establish a second conductive path to charge a battery, wherein a sum of a voltage across the first flying capacitor and the system voltage is applied to the battery, wherein the switched capacitor converter comprises:
    a first switch, a second switch, a third switch and a fourth switch connected in series between a first voltage bus and ground, the first voltage bus being coupled to the battery, wherein the first group of switches comprises the second switch and the fourth switch, and the second group of switches comprises the first switch and the third switch;

the first flying capacitor connected between a common node of the first switch and the second switch, and a common node of the third switch and the fourth switch;

a fifth switch, a sixth switch, a seventh switch and an eighth switch connected in series between the first voltage bus and ground; and a second flying capacitor connected between a common node of the fifth switch and the sixth switch, and a common node of the seventh switch and the eighth switch.

2. The method of claim 1, further comprising:

turning on the second switch and configuring the fourth switch as a first current sink to charge the first flying capacitor to the predetermined voltage level, wherein the predetermined voltage level is approximately equal to a predetermined charging headroom voltage plus a difference between a voltage across the battery and the system voltage;

turning on the third switch and configuring the first switch as a first current source to charge the battery with a predetermined pre-charge current; and after a voltage across the first switch is less than a predetermined minimum charging headroom voltage, turning off the third switch and the first switch, and turning on the second switch and configuring the fourth switch as the first current sink to charge the first flying capacitor.

3. The method of claim 2, further comprising:

turning on the sixth switch and configuring the eighth switch as a second current sink to charge the second flying capacitor to the predetermined voltage level;

turning on the seventh switch and configuring the fifth switch as a second current source to charge the battery with the predetermined pre-charge current; and after a voltage across the fifth switch is less than the predetermined minimum charging headroom voltage, turning off the seventh switch and the fifth switch, and turning on the sixth switch and configuring the eighth switch as the second current sink to charge the second flying capacitor.

4. The method of claim 3, wherein:

the first current source and the second current source are configured to provide power for charging the battery in an alternating manner.

5. The method of claim 1, further comprising:

during a load transient, configuring the switched capacitor converter to leave a 1:2 charge pump mode and enter a 2:1 charge pump mode, wherein in the 2:1 charge pump mode, the battery is configured to provide power for maintaining the system voltage at the system bus.

6. The method of claim 1, further comprising:

during a battery-only mode, configuring the switched capacitor converter to leave a 1:2 charge pump mode and enter a 2:1 charge pump mode, wherein in the 2:1 charge pump mode, the battery is configured to provide power for maintaining the system voltage at the system bus.

7. The method of claim 1, wherein:

the second switch is a first body-switch MOSFET, and wherein the first group of switches comprises the second switch and the fourth switch, and the second group of switches comprises the first switch and the third switch; and the sixth switch is a second body-switch MOSFET.

8. The method of claim 7, further comprising:

turning on the fourth switch and partially turning on the second switch to charge the first flying capacitor to the predetermined voltage level after configuring an anode of a body diode of the second switch to be connected to a drain of the second switch, wherein the predetermined voltage level is approximately equal to a predetermined charging headroom voltage plus a difference between a voltage across the battery and the system voltage;

after a voltage across the first flying capacitor reaches the predetermined voltage level, turning off the second switch;

during a turn-off process of the fourth switch, detaching the anode of the body diode of the second switch from the drain and a source of the second switch for a predetermined moment;

after the fourth switch has been turned off, configuring the anode of the body diode of the second switch to be connected to the source of the second switch;

turning on the third switch and configuring the first switch as a first current source to charge the battery with a predetermined pre-charge current; and after a voltage across the first switch is less than a predetermined minimum charging headroom voltage, turning off the third switch and the first switch, and turning on the fourth switch and partially turning on the second switch to charge the first flying capacitor.

9. The method of claim 1, wherein:

the second switch comprises two transistors back-to-back connected to each other, and wherein the first group of switches comprises the second switch and the fourth switch, and the second group of switches comprises the first switch and the third switch; and the sixth switch comprises two transistors back-to-back connected to each other.

10. The method of claim 9, further comprising:

turning on the fourth switch and partially turning on the second switch to charge the first flying capacitor to the predetermined voltage level, wherein the predetermined voltage level is approximately equal to a predetermined charging headroom voltage plus a difference between a voltage across the battery and the system voltage;

after a voltage across the first flying capacitor reaches the predetermined voltage level, turning off the second switch and the fourth switch;

turning on the third switch and configuring the first switch as a first current source to charge the battery with a predetermined pre-charge current; and after a voltage across the first switch is less than a predetermined minimum charging headroom voltage, turning off the third switch and the first switch, and turning on the fourth switch and partially turning on the second switch to charge the first flying capacitor.

11. The method of claim 1, wherein:

the first switch comprises two transistors back-to-back connected to each other, and wherein the first group of switches comprises the second switch and the fourth switch, and the second group of switches comprises the first switch and the third switch; and the fifth switch comprises two transistors back-to-back connected to each other.

12. The method of claim 11, further comprising:
turning on the second switch and partially turning on the fourth switch to charge the first flying capacitor to a level equal to the system voltage;
after a voltage across the first flying capacitor reaches the system voltage, turning off the second switch and the fourth switch;
turning on the third switch and configuring the first switch as a first current source to charge the battery with a predetermined pre-charge current; and
after a voltage across the first switch is less than a predetermined minimum charging headroom voltage, turning off the first switch and the third switch, and turning on the second switch and partially turning on the fourth switch to charge the first flying capacitor.

13. A battery charging system comprising:
a buck switching converter coupled between a voltage bus and a system voltage bus;
a bypassing switch coupled between an input and an output of the buck switching converter; and
a switched capacitor converter coupled between the system voltage bus and a battery, wherein an input terminal of the switched capacitor converter is directly connected to an output of the buck switching converter, wherein the switched capacitor converter comprises:
a first switch, a second switch, a third switch and a fourth switch connected in series between a first voltage bus and ground, the first voltage bus being coupled to the battery;
a first flying capacitor connected between a common node of the first switch and the second switch, and a common node of the third switch and the fourth switch;
a fifth switch, a sixth switch, a seventh switch and an eighth switch connected in series between the first voltage bus and ground; and
a second flying capacitor connected between a common node of the fifth switch and the sixth switch, and a common node of the seventh switch and the eighth switch.

14. The battery charging system of claim 13, wherein:
the first flying capacitor is charged to a predetermined voltage level through turning on the second switch and configuring the fourth switch as a first current sink, and wherein the predetermined voltage level is approximately equal to a predetermined charging headroom voltage plus a difference between a voltage across the battery and a system voltage at the system voltage bus;
the battery is charged with a predetermined pre-charge current through turning on the third switch and configuring the first switch as a first current source, and wherein a sum of a voltage across the first flying capacitor and the system voltage is applied to the battery; and
after a voltage across the first switch is less than a predetermined minimum charging headroom voltage, the third switch and the first switch are configured to be turned off, the second switch are configured to be turned on, and the fourth switch is configured as the first current sink to charge the first flying capacitor.

15. The battery charging system of claim 13, wherein:
the second switch is a first body-switch MOSFET; and
the sixth switch is a second body-switch MOSFET.

16. The battery charging system of claim 13, wherein:
the second switch comprises two transistors back-to-back connected to each other;
and
the sixth switch comprises two transistors back-to-back connected to each other.

17. The battery charging system of claim 13, wherein:
the switched capacitor converter is coupled to the battery through a linear regulator.

18. The battery charging system of claim 13, wherein:
two transistors of the first switch are back-to-back connected to each other; and
two transistors of the fifth switch are back-to-back connected to each other.

* * * * *